(12) United States Patent
Maeda et al.

(10) Patent No.: US 6,188,662 B1
(45) Date of Patent: Feb. 13, 2001

(54) RECORDING APPARATUS WITH A RECEIVING FUNCTION AND RECORDING APPARATUS

(75) Inventors: Yasuaki Maeda, Kanagawa; Hideki Nagashima, Tokyo; Takashi Fujimoto, Chiba, all of (JP)

(73) Assignee: Sony Corporation, Tokyo (JP)

(*) Notice: Under 35 U.S.C. 154(b), the term of this patent shall be extended for 0 days.

(21) Appl. No.: 09/206,076

(22) Filed: Dec. 4, 1998

(30) Foreign Application Priority Data

Dec. 24, 1997 (JP) .................................................. 9-354939

(51) Int. Cl.$^7$ ................................................... G11B 27/00

(52) U.S. Cl. ............................................. 369/83; 360/13

(58) Field of Search ................................. 369/30, 32, 33, 369/47, 48, 60.01, 83; 360/13, 27, 31; 386/95, 52

(56) References Cited

U.S. PATENT DOCUMENTS 5,237,412 * 8/1993 Nakajima ............................ 386/95 X
5,905,844 * 5/1999 Kimura et al. ......................... 386/95

* cited by examiner

Primary Examiner—Paul W. Huber
(74) Attorney, Agent, or Firm—Limbach & Limbach L.L.P.; Seong-Kun Oh

(57) ABSTRACT

There is provided a recording apparatus to perform the recording operation to a recording medium by receiving audio information as the main data and character information as subdata transmitted from a broadcasting station in view of extracting the partitioning code formed of the predetermined code included in the subdata, storing in memory an address recorded in a recording medium when the partitioning code is extracted, automatically performing the editing process based on the address stored in the memory when the audio information as the main data and character information as the subdata are recorded to the recording mediums and easily performing the searching operation during the reproducing operation.

10 Claims, 21 Drawing Sheets

U-TOC SECTOR 0

U-TOC SECTOR 1

U-TOC SECTOR 4

FIG. 9A
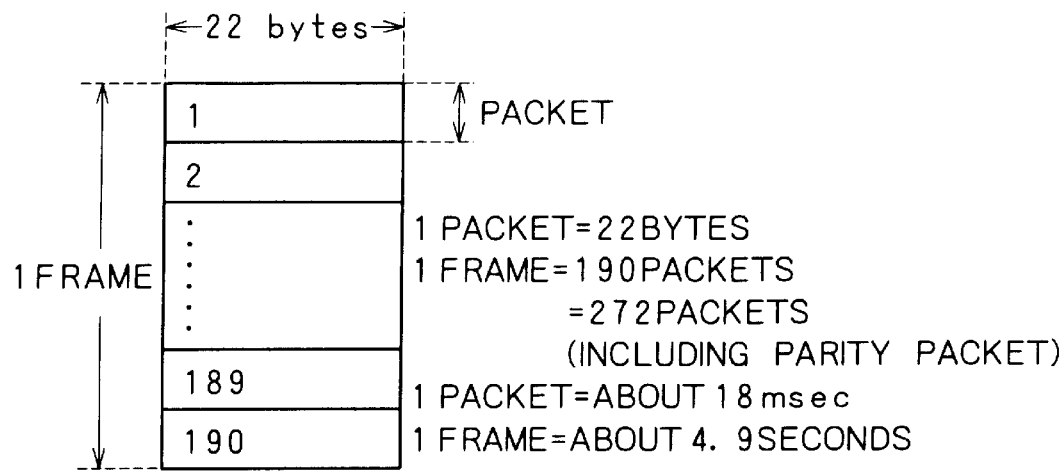
FIG. 9B
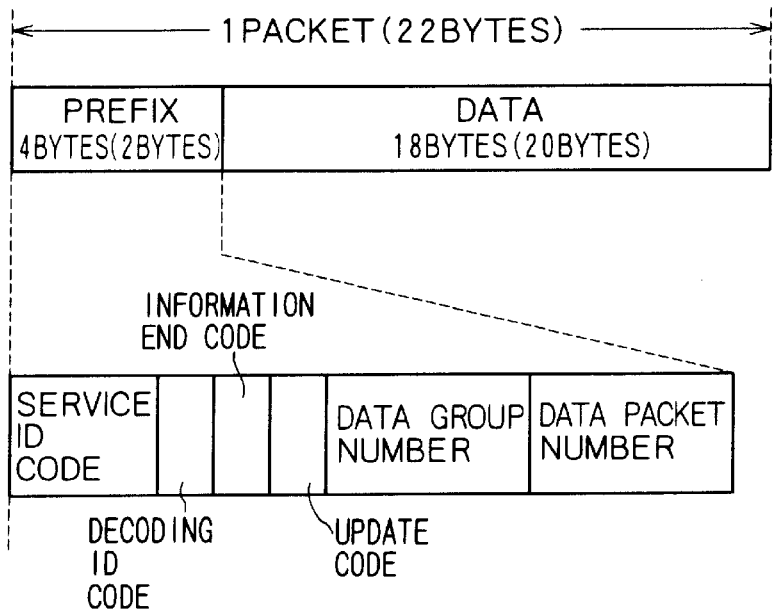
FIG. 9C

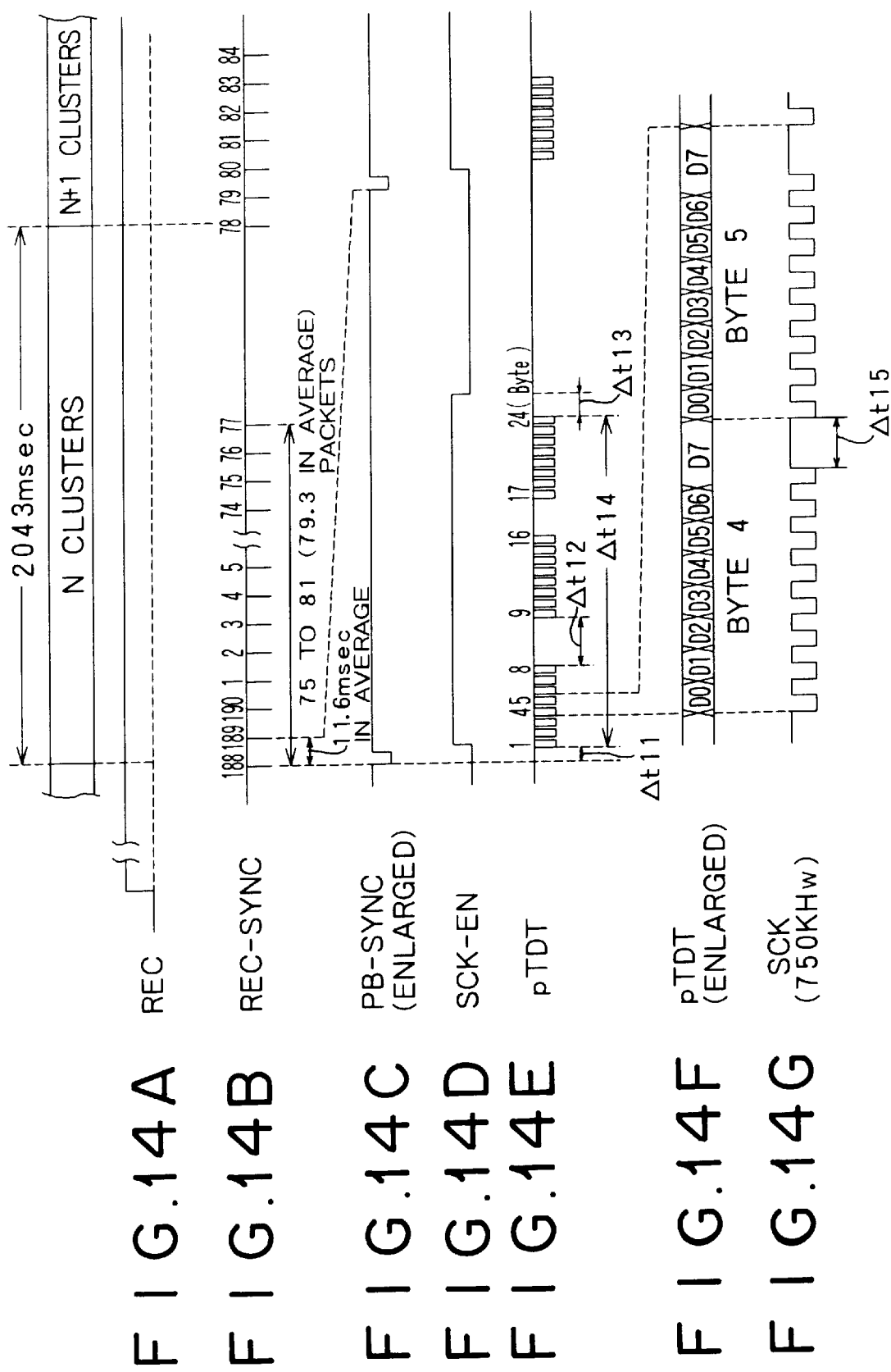

FIG. 15A wTDT:1 PACKET=22+2=24 BYTES

| | BYTES 1 AND 2 (PACKET ID CODE) | BYTES 3 TO 24 |
|---|---|---|
| PARITY PACKET | 8000h | ALL 00h |
| ORDINARY PACKET | 0000h | PACKET DATA |
| NO DATA | 4000h | ALL 00h |

FIG. 15B pTDT:1 PACKET= 24 BYTES

| | BYTES 1 AND 2 (PACKET ID CODE) | BYTES 3 TO 24 |
|---|---|---|
| ORDINARY PACKET | 0000h | PACKET DATA |

FIG.18A

「TEX BLUES」
ABC BAND

FIG.18B

♫ 「TEX BLUES」
ABC BAND

FIG.19

| TRACK MARK | ADDRESS | TRACK NAME | CHARACTER INFORMATION |
|---|---|---|---|
| TM1 | A2 | TM1 | 「MY SONG」 XYZ |
| TM2 | A4 | TM2 | 「TEX BLUSE」 ABC BAND |
| TM3 | A6 | TM3 | 「TEEN TOWN」 TARO |
| TM4 | A8 | TM4 | 「CITY」 JIRO |

FIG.20

U-TOC SECTOR 0

POINTER AREA

| P-DFA:- | P-ENPTY:02h | P-FRA:01h |
|---|---|---|
| P-TN01:- | P-TN02:- | P-TN03:- |
| P-TN04:- | P-TN05:- | P-TN06:- |
| P-TN07:- | P-TN08:- | P-TN09:- |
| P-TN0253:- | P-TN0254:- | P-TN0255:- |

TABLE AREA

|  | START ADDRESS | END ADDRESS | TRACK MODE | LINK INFORMATION |
|---|---|---|---|---|
| (01h) | A0 | A11 |  | — |
| (02h) | — | — |  | 03h |
| (03h) | — | — |  | 04h |
| (04h) | — | — |  | 05h |
| (05h) | — | — |  | 06h |
| (06h) | — | — |  | 07h |
| (07h) | — | — |  | 08h |
| (08h) | — | — |  | 09h |
| (09h) | — | — |  | 0Ah |
| (0Ah) | — | — |  | 0Bh |
| (0Bh) | — | — |  | 0Ch |
| (FEh) | — | — |  | FFh |
| (FFh) | — | — |  | — |

FIG.21

U-TOC SECTOR 0

POINTER AREA

| P-DFA: − | P-ENPTY: 07h | P-FRA: 06h |
|---|---|---|
| P-TN01: 01h | P-TN01: 02h | P-TN01: 03h |
| P-TN04: 04h | P-TN01: 05h | P-TN06: − |
| P-TN07: − | P-TN08: − | P-TN09: − |
| P-TN0253: − | P-TN0254: − | P-TN0255: − |

TABLE AREA

| | START ADDRESS | END ADDRESS | TRACK MODE | LINK INFORMATION |
|---|---|---|---|---|
| (01h) | A0 | A1 | | − |
| (02h) | A2 | A3 | | − |
| (03h) | A4 | A5 | | − |
| (04h) | A6 | A7 | | − |
| (05h) | A8 | A9 | | − |
| (06h) | A10 | A11 | | − |
| (07h) | − | − | | 08h |
| (08h) | − | − | | 09h |
| (09h) | − | − | | 0Ah |
| (0Ah) | − | − | | 0Bh |
| (0Bh) | − | − | | 0Ch |
| (FEh) | − | − | | FFh |
| (FFh) | − | − | | − |

FIG. 22

U-TOC SECTOR 1

POINTER AREA

| P-TNA1 : – | P-ENPTY : 0Bh | |
|---|---|---|
| | P-TNA2 : 01h | P-TNA3 : 03h |
| P-TNA4 :–06h | P-TNA5 : 09h | P-TNA6 : – |
| P-TNA7 : – | P-TNA8 : – | P-TNA9 : – |
| P-TNA253 : – | P-TNA254 : – | P-TNA255 : – |

SLOT AREA

| | TRACK NAME | LINK INFORMATION | |
|---|---|---|---|
| (01h) | | 02h | TRCK NAME OF TK2 |
| (02h) | | – | |
| (03h) | | 04h | TRCK NAME OF TK3 |
| (04h) | | 05h | |
| (05h) | | – | |
| (06h) | | 07h | TRCK NAME OF TK4 |
| (07h) | | 08h | |
| (08h) | | – | |
| (09h) | | 0Ah | TRCK NAME OF TK5 |
| (0Ah) | | – | |
| (0Bh) | | 0Ch | |
| (FEh) | | FFh | |
| (FFh) | | – | |

← 7 BYTES →

RECORDING APPARATUS WITH A RECEIVING FUNCTION AND RECORDING APPARATUS

FIELD OF THE INVENTION

The present invention relates to a recording apparatus with a receiving function and a recording apparatus which can receive a broadcast program including character information, such as an FM character multiplex broadcasting and also, which can record the broadcast audio signal and character information to the predetermined recording medium.

BACKGROUND OF THE INVENTION

The FM multiplex broadcasting is widely known in which the subdata such as character information is generally superimposed for the transmission purpose to the free area of the frequency band.

The character data broadcast after it is multiplexed can be demodulated by a character decoder provided in a radio receiver and it is then displayed in a small size display unit provided, for example, within a radio receiver.

As the character data, a character program, for example, composed of plural pages is repeatedly broadcast, covering the programs from a program broadcasting the contents not related at all to contents of broadcast programs such as weather forecast and traffic information to a program broadcasting contents in relation to the broadcast contents such as name of music piece, name of performer, program contents and name of the DJ of the broadcast program.

Particularly, as the music piece information as program information, character information including the name of the music piece and the name of the artist is broadcast simultaneously with the music piece as the main information when a certain music piece is broadcast. In general, this music name information is transmitted when the music name is started to be transmitted, and moreover such music name information is broadcast for several times while it is being broadcast.

Various kinds of recording media and corresponding recording/reproducing apparatuses are developed and particularly, a medium known as a minidisc which allows a user to freely record audio data is also popular in recent years. A music piece broadcast from an FM radio station can be recorded by utilizing such minidisc system and therefore the minidisc system integrally comprising the receiving function and recording/reproducing function is also developed, considering such sophisticated performance. Alternatively, even if these are not integrated, it is also possible to conduct the recording through connection by transmission cable of the tuner and recording/reproducing apparatus.

Moreover, in the case of the minidisc, the management information called a User Table of Content (hereinafter referred to as U-TOC) is recorded, in addition to the main data such as a music piece, for management of the data recorded area on which recording is performed by a user and the free area as the recordable area.

The recording area is discriminated during the recording operation by referring to the U-TOC and the reproducing area is discriminated by referring to the U-TOC during the reproducing operation.

Namely, each recorded music piece is controlled in the data unit as a program (hereafter "program" is called "track") in the U-TOC with recording of the start address and end address, etc. Moreover, in regard to the free area as the recordable area, the start address and end address, etc. are recorded considering this area as the area used for data recording later.

Moreover, since each music piece on the disk is managed by such U-TOC, a music piece can be edited only by updating the U-TOC.

For example, editing processes such as the dividing function to divide one track to a plurality of tracks, the combining function to combine a plurality of tracks to one track, the moving function to change the track number given depending on the track sequence for reproduction and the deleting function to delete unnecessary tracks (also called the erasing function) may be easily and quickly performed.

In addition, it is also possible that a name of music piece is registered as a track name for each track and thereby it can be displayed, for example, at the time of reproduction.

Thereby, a user can edit one or a plurality of tracks once recorded on the disk by utilizing such functions and can also enjoy generation of a personal original disk.

Particularly, the recorded music pieces can be edited very easily and conveniently.

In the case of recording of the broadcast audio signal to a minidisc, the audio data to be recorded to the disk by such recording operation is processed, after the recording, as one track. For example, when the air-check is conducted for the broadcasting of 60 minutes, one track in the length of 60 minutes is formed on the disk.

In the case of a minidisc system, queue search is enabled in track units, but high speed access to the intermediate part of the contents recorded as one track has been impossible.

Therefore, here rises a problem that operation for the reproduction is difficult when it is requested to reproduce a particular music piece from the broadcast program recorded by a user.

For example, even when 10 music pieces are broadcast during the broadcasting of 60 minutes, since contents of 60 minutes are considered as one track, queue search to each music piece is impossible. Moreover, the audio signals of narration and commercial forming a program are also recorded between music pieces.

In addition, a user does not know where is the music piece which he wants to hear again among the contents of 60 minutes, unless he is recording the program while he is hearing it.

Therefore, when a user wants to hear again the desired music piece, he is forced to execute a very troublesome operation because he must determine whether the voice signal reproduced by the high speed reproducing mode is what he wants to hear again through the fast speed reproducing operation, for example, from the starting part of the recorded area.

The inventors of the present invention have presented in the Japanese Published Unexamined Patent Application No. HEI 9-344748, as related art, the technique to record a character information to a recording medium simultaneously with the audio signal as the main data during the dubbing operation of the broadcasting in which the character broadcasting (teletext) is multiplexed.

According to this technique, as the recording operation, the character information as subdata can be recorded to the disk together with the audio signal as the main data, and moreover, the recorded audio signal as the main data can also be reproduced during the reproducing operation and the character information as the above subdata can also be displayed synchronously. That is, a program information as the subdata regarding the main data can also be observed during reproduction of the recorded audio signal as the main data by enabling the recording and reproducing of the character information. Thereby, for example, names of the broadcast music pieces can be known at the time of reproduction.

However, when it is requested to make an access to a part of the music pieces recorded during the reproducing operation, troublesome search operation is also required as explained above and consideration is not taken into account to this problem.

Considering the problems explained above, it is an object of the present invention to realize smooth operation performance during the reproducing mode by simultaneously recording the audio information broadcast by the character multiplex broadcasting and character information to a recording medium and conducting track dividing process in the adequate timing for the operation of latter reproducing mode.

SUMMARY OF THE INVENTION

The present invention is characterized, in order to solve the problems of the related art explained above, in providing a recording apparatus with the receiving function, comprising a receiving means for receiving main data and subdata including the partitioning code transmitted from a broadcasting station, a partitioning code extracting means for extracting the partitioning code from the subdata received by the receiving means, a recording means for recording the main data and subdata from which the partitioning code is removed received by the receiving means to a recording medium, a storing means for storing the recording position on the recording medium when the partitioning code is extracted by the partitioning code extracting means and an editing means for performing dividing edition of the main data based on the recording position stored in the storing means after the main data and subdata from which the partitioning code is removed received by the receiving means are recorded to the recording medium.

As the recording apparatus for receiving the main data and subdata including the partitioning code transmitted from a broadcasting station and recording the received main data and subdata on a recording medium including the main data area for recording the main data, the subdata area for recording the subdata, a first management area for managing the main data recorded in the main data area and a second management area for managing the subdata recorded in the subdata area, the present invention is moreover characterized in comprising the partitioning code extracting means for extracting the partitioning code from the received subdata, the recording means for recording the received main data to the main data area and also recording the subdata from which the partitioning code is removed to the subdata area, the storing area for storing the recording position in the main data area of the recording medium when the partitioning code is extracted with the partitioning code extracting means and the editing means for editing the first management area to perform the dividing edition of the main data based on the recording position stored in the recording means after the received main data and subdata from which the partitioning code is removed are recorded to the recording medium.

BRIEF DESCRIPTION OF THE DRAWINGS

FIG. 9A is a schematic diagram showing a data format of one frame of character information to be transmitted by the FM character multiplex broadcasting.

FIG. 9B is a schematic diagram showing a data format of one packet forming one frame with a plurality of packets.

FIG. 9C shows a data format of the prefix section included in one packet.

FIG. 14A is a timing chart showing the timing of the recording condition signal REC and cluster decoding.

FIG. 14B is a timing chart showing the recording synchronous signal PB-SYNC.

FIG. 14C is a timing chart in which the recording synchronous signal PB-SYNC is expanded in the time axis direction.

FIG. 14D is a timing chart of the clock enable signal SCK-EN.

FIG. 14E is a timing chart showing the transfer timing of the pTDT signal as the character information.

FIG. 14F is a timing chart in which the transfer timing of the pTDT signal as the character information is expanded in the time axis direction.

FIG. 14G is a timing chart of the clock signal SCK.

FIG. 15A is a table of packet data transferred during the recording operation.

FIG. 15B is a table of packet data transferred during the reproducing operation.

FIG. 18A is a display example of the character information as subdata transmitted from a broadcasting station.

FIG. 18B is a display example of the character information as subdata and particular code transmitted from a broadcasting station.

FIG. 19 is a table of data generated in the memory during the recording operation.

FIG. 20 is a table showing the management condition of U-TOC sector 0 before the recording operation.

FIG. 21 is a table showing the management condition of U-TOC sector 0 after the recording operation.

FIG. 22 is a table showing the management condition of U-TOC sector 1 after the recording operation.

DESCRIPTION OF THE PREFERRED EMBODIMENTS

The preferred embodiments of the present invention will be explained.

An example of this embodiment indicates a recording and reproducing system which receives the FM character multiplex broadcasting and performs the recording/reproducing operations using a magneto-optical disk (minidisc) as a recording medium.

In practice, a system corresponding to the recording system of the present invention comprises a recording/reproducing unit 1 as a minidisc recorder/player and a tuner unit 30 as the FM multiplex broadcasting tuner. Moreover, the recording/reproducing unit 1 corresponds to the recording apparatus of the present invention.

The recording/reproducing unit 1 and tuner unit 30 may be integrally provided within an apparatus or may also be provided individually to form a system through connection. For connection of these units, the wired connection with cables or the radio connection with transmission and reception of infrared beam signal or radio frequency signal is possible as desired.

The preferred embodiment will be explained in the following sequence.

1. System Configuration
2. Cluster Structure of Minidisc System
3. Area format of Minidisc
4. U-TOC
5. Area Format of Buffer Memory
6. Character Information Format to be Broadcast
7. Signal Connection Mode for Character Data Transmission
8. Character Data Transfer Process During Recording
9. Character Data Transfer Process During Reproducing
10. Track Mark Operation corresponding to Recording Operation

System Configuration

Figure 1:
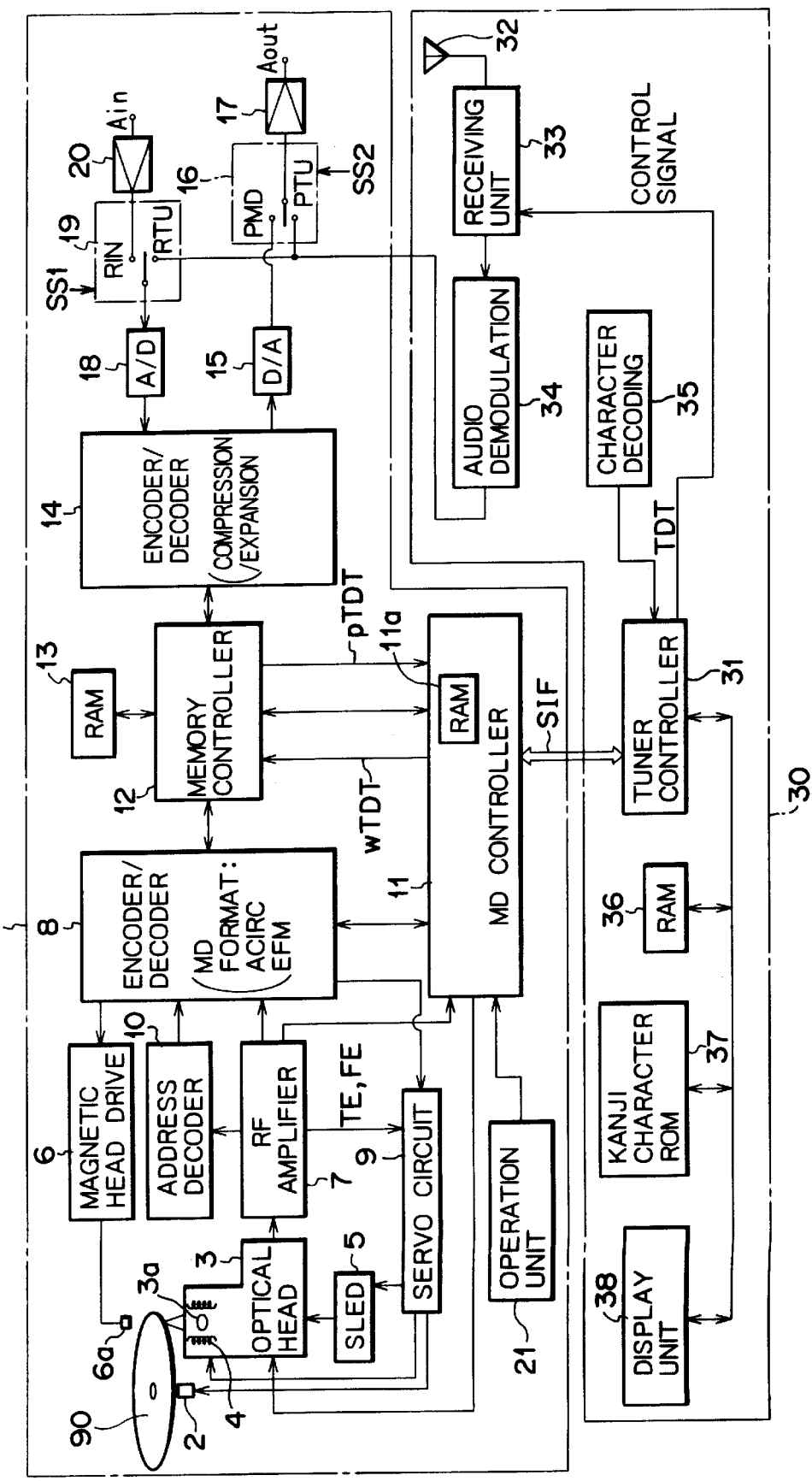
FIG. 1 is a block diagram of a recording/reproducing apparatus with the receiving function applied to the present invention.

FIG. 1 shows a block diagram of the recording/reproducing system of the present invention.

A recording/reproducing unit 1 forming this recording/reproducing system is designed to conduct recording, reproducing or editing operation to a minidisc and a tuner unit 30 is designed to receive the FM multiplex broadcasting and display and output the received character information.

First, configuration of the tuner unit 30 will be explained.

The tuner unit 30 executes the FM receiving operation and related processes on the basis of the control of the tuner controller 31 by a micro-computer.

The broadcasting signal received by an antenna 32 is received and detected by an FM tuner/character receiving unit (hereafter referred to as receiving unit) 33.

Namely, the receiving unit 33 selects a program depending on the control of the tuner controller 31 in accordance with user's operation and timer operation.

The received audio signal among those obtained by the receiving unit 33 demodulated by a stereophonic audio demodulating unit 34 to become a stereophonic audio signal.

This stereophonic audio signal is recorded to a disk 90 by the recording/reproducing unit 1 and is also output as an output audio signal for monitoring the broadcasting. The signal sequence for recording to the disk 90 will be explained later but the signal sequence as the output for monitoring the broadcasting is supplied to an amplifier 17 via the PTU terminal of the output switch 16 of the recording/reproducing unit 1 and is then supplied to the audio output system not illustrated having a power amplifier and speakers from the terminal Aout and is finally output as the audio output.

In this configuration example, the reproduced audio signal from the disk 90 or the audio signal by reception of broadcasting obtained by an audio demodulating unit 34 is selected by the output switch 16 and is then supplied to the speakers. However, when the recording/reproducing unit 1 and the tuner unit 30 are provided individually, for example, it is allowed to form the audio output system including power amplifiers, and speakers are formed within the tuner unit 30 and the received audio signal is output therefrom.

Moreover, in this example, for the user's operation for selecting the receiving program, the manipulating unit 21 of the recording/reproducing unit 1 is used and such operation information is supplied to the tuner controller 31 through communication with the MD controller 11 explained later but it is also possible to provide the operation unit for program selection to the tuner unit 30.

The signal as the multiplexed character information among the signals obtained from the receiving unit 33 is decoded by a character decoding unit 35 and thereby a character information TDT can be extracted.

This character information TDT is supplied also to the tuner controller 31 and is then stored in RAM 36.

The tuner controller 31 can put the character information TDT to RAM 36 and can display it to a display unit 38 on the real-time. Of course, the character information accumulated in RAM 36 can be displayed later on the display unit 38 at a certain timing.

RAM 36 is configured, for example, of a semiconductor memory such as D-RAM (Dynamic Random Access Memory) or S-RAM (Static Random Access Memory) to store the character information TDT based on the instruction of tuner controller 31 and various data required for the other operations.

The display unit 38 executes display of the character information TDT and message or guide required for user's operation based on the control of the tuner controller 31.

Moreover, in order to realize the display of Kanji based on the character information TDT, a Kanji ROM 37 storing the font information of Kanji, etc. is also provided.

In addition, the tuner controller 31 causes the display unit 38 to display the data based on the operation and condition in the side of the recording/reproducing unit 1 depending on the display information transmitted from the MD controller 11. When the display unit 38 is also provided inside of the recording/reproducing unit 1, it is enough to execute the such display inside of the recording/reproducing unit 1.

The tuner controller 31 performs communications with the MD controller 11 with various signals, for example, in the serial interface communication mode SIF (Serial Interface Communication). For example, the cooperative operations by the recording/reproducing unit 1 and tuner unit 30 can be realized with communication, for example, of the operation information of the manipulating unit 21, display information of the display unit 38 and status information indicating the mutual operating conditions.

Moreover, the tuner controller 31 transmits the character information decoded as the character information TDT to the MD controller 11 as the character information wTDT to be recorded for the recording to the disk 90 and the MD controller 11 transmits, to the tuner controller 31, the character information pTDT reproduced by the recording/reproducing unit 1 as the character information recorded to the disk 90 for the display output at the display unit 38.

Communication structure for transmitting and receiving of the character information at the time of recording and reproducing mode will be explained later.

Configuration of the recording/reproducing unit 1 will then be explained hereunder.

The recording/reproducing unit 1 is configured to record an audio signal input from the terminal Tin and an audio signal received by the tuner unit 30 to a disk 90. Moreover, the character information TDT decoded by the tuner unit 30 can be recorded to the disk 90 simultaneously with the audio signal.

In addition, for example, the microphone input terminal and digital input terminal can naturally be provided to record the audio signals from various audio sources to the disk 90 but these processes are not explained here.

A magneto-optical disk 90 loaded to the recording/reproducing unit 1 is driven to rotate by a spindle motor 2. The magneto-optical disk 90 is radiated with a laser beam by an optical head 3 during the recording and reproducing operation.

The optical head 3 provides a high level laser output, at the time of recording, to heat the recording track up to the Curie temperature and also provides a comparatively low level laser, at the time of reproducing operation, to detect the data from the reflected beam by means of the magnetic Kerr-effect.

Therefore, the optical head 3 is provided with a laser diode as a laser output means, an optical system consisting of a deflection beam splitter and an objective lens, etc. and a detector to detect the reflected light beam. The objective lens 3a is held by a double-axis mechanism 4 to displace in the disk radius direction and in the direction to become near to and far from the disk.

Moreover, a magnetic head 6a is also arranged at the position provided opposed to the optical head 3 sandwiching the disk 90. The magnetic head 6a applies the magnetic field modulated by the data supplied to the magneto-optical disk 90.

The optical head 3 and magnetic head 6a can be moved by the sled mechanism 5 in the radial direction of the disk.

With the reproducing operation, the information detected from the disk 90 by the optical head 3 is then supplied to an RF amplifier 7. The RF amplifier 7 extracts, with the arithmetic process for the information supplied, the reproduced RF signal, tracking error signal TE, focus error signal FE, and groove information which is the absolute position information previously recorded as wobbling groove to the magneto-optical disk 90.

The extracted reproduced RF signal is then supplied to the encoding/decoding unit 8. Moreover, the tracking error signal TE, focus error signal FE are supplied to the servo circuit 9 and the group information is supplied to an address decoder 10.

The servo circuit 9 generates various servo drive signals from the tracking error signal TE, focus error signal FE supplied, a track jump instruction, an access instruction from the MD controller 11 formed by the micro-computer and a rotating speed detecting information of spindle motor 2 and controls the double-axis mechanism 4 and sled mechanism 5 to execute the focus and tracking control to control the spindle motor 2 to the constant linear velocity.

The address decoder 10 extracts an address information by decoding the group information supplied. This address information is supplied to the MD controller 11 for various controls.

Moreover, the reproduced RF signal is decoded by the encoding/decoding unit 8. In this case, the address and subcode data are also extracted and are then supplied to the MD controller 11.

The encoding/decoding unit 8 executes the decoding process such as EFT demodulation (Eight Fourteen Demodulation Coding), ACIRC (Advanced Cross Interleave Reed Solomon Coding) error correction, sector decoding corresponding to the minidisc format for the reproduced RF signal. The decoded audio data written once to the buffer memory 13 by the memory controller 12. Data reading from the disk 90 by the optical head 3 and transfer of reproduced data in the system up to the buffer memory 13 from the optical head 3 is generally performed intermittently at 1.41 Mbit/sec.

The data written in the buffer memory 13 is read in the timing when the transfer of reproduced data is conducted at 0.3 Mbit/sec and is then supplied to the encoding/decoding unit 14. Here, the data is subject to the reproducing signal process such as the decoding process for the audio compression process of the so-called ATRAC (Adaptive Transfer Acoustic Coding) system and thereby the digital audio signal of 44.1 kHz sampling and 16 bits quantization can be obtained. This digital audio signal is converted to an analog signal by the D/A converter 15, supplied to the amplifier 17 via the PMD terminal of the output switch 16, then supplied to the audio output system such as power amplifier and speaker, etc. from the terminal Aout as the reproduced output.

Therefore, the output switch 16 is connected, during the disk reproducing operation, to the PMD terminal by the control signal SS2 from the MD controller 11 and is also connected to the PTU terminal when the broadcasting signal is received by the tuner unit 30.

To the magneto-optical disk 90, the audio signals from the tuner unit 30 and audio signals input from the terminal Ain can be recorded as explained above.

In the case of recording the audio signals from the tuner unit 30, the MD controller 11 connects the input switch 19 to the RTU terminal with the control signal SS1. Thereby, the audio signal from the audio demodulating unit 34 is converted to the digital data by the A/D converter 18 and is then supplied to the encoding/decoding unit 14.

Meanwhile, in the case of recording the audio signal input from the terminal Ain, the MD controller 11 connects the input switch 19 to the RIN terminal with the control signal SS1. Thereby, the audio signal input from the terminal Ain and is amplified by the amplifier 20 is converted to the digital data by the A/D converter 18 and is then supplied to the encoding/decoding unit 14.

The encoding/decoding unit 14 executes, for the supplied audio data, the audio compression encoding process as the ATRAC system. The audio data compressed by the encoding/decoding unit 14 is once written to the buffer memory 13 by the memory controller 12 at the transfer rate of 1.4 Mbps and it is then read in the transfer rate of 1.4 Mbps and is then sent to the encoding/decoding unit 8. After the encoding processes such as the sector encoding, ACIRC encoding and EFM modulation, etc. in the encoding/decoding unit 8, the data is supplied to the magnetic head drive circuit 6.

The magnetic head drive circuit 6 supplies a magnetic head drive signal to the magnetic head 6a depending on the encoded recording data. That is, the magnetic head 6a applies the N-pole or S-pole magnetic field to the magneto-optical disk 90. Moreover, in this case, the MD controller 11 supplies the control signal to the optical head to emit a laser beam of the recording level.

The MD controller 11 is a microcomputer providing CPU, program ROM, work RAM and interface, etc.

This controller 11 executes the operation control of each part for the recording and reproducing operation for the disk 90 and also executes the editing process of the tracks accommodated in the disk 90.

The MD controller 11 comprises the RAM 11a which functions as work RAM and this RAM 11a is used to store the information for track mark process explained later and as the work area for various editing processes.

The operation unit 21 is provided with various operation keys with which a user instructs the recording or reproducing or editing operations at the recording/reproducing unit 1 and the receiving operation at the tuner unit 30. In more practical, the reproduction key, recording key, stop key, recording key, AMS (Auto Music Sensor)/search key, temporary stop key, edition mode key and editing operation key, etc. are provided and moreover operators for input of disk title and track name and the other information are also provided. The MD controller 11 executes various kinds of predetermined operation controls depending on the operation information from the operation unit 21.

On the occasion of conducting the recording or reproducing operation to the disk 90, management information, namely P-TOC (Premastered TOC), U-TOC (user TOC) recorded in the disk 90 must be read. The MD controller 11 discriminates the address of the area to be recorded and the address of the area to be reproduced on the disk 90 depending on such management information.

This management information is held in the buffer memory 13.

The MD controller 11 reads these pieces of management information by executing the reproducing operation of the innermost circumference side of the disk in which the management information is recorded when the disk 90 is loaded and then stores such management information to the buffer memory 13 for the purpose of making reference thereto when the recording or reproducing or editing operation is conducted later to the disk 90.

Moreover, U-TOC is rewritten depending on the recording of data and various editing processes but the MD controller 11 conducts the U-TOC update process, for each recording/editing operation, to the U-TOC information stored in the buffer memory 13 and also rewrites the U-TOC area of the disk 90 in the predetermined timing depending on the update operation.

When the MD controller 11 transmits the TOC information of the disk 90 to the tuner controller 31, the tuner controller 31 executes the display operation or the other necessary processes depending on the recording condition of disk 90 and the other.

In this embodiment, when the audio signal received by the tuner unit 30 is recorded to the disk 90 as the recording operation explained above, the character information TDT decoded by the character decoding unit 35 can also be recorded to the disk 90. The character information is recorded simultaneously with the audio signal as the subdata explained later. This audio signal and character information are recorded to the disk 90 as the main data. Here, the main data is the information recorded to the program area explained later in FIG. 3A.

For the recording of audio signal and character information, the audio signal is supplied, during the air-check recording operation, from the audio demodulating unit 34 via the input switch, this signal is recorded as the recording data to the disk 90 through the processes by the encoding/decoding unit 14, buffer memory 13, encoding/decoding unit 8 as explained above. But, simultaneously, the decoded character information is transmitted to the MD controller 11 from the tuner controller 31. The MD controller 11 supplies this character information for recording wTDT to the buffer memory 13, also supplies this information to the encoding/decoding unit 14 in the predetermined timing for the encoding process together with the audio data. Thereby, simultaneous recording to the disk 90 of the audio information and character information can be executed.

When the data recorded by air-check recording is reproduced, the reproduced data as the audio information and the reproduced data as the character information are accumulated in the buffer memory 13 through the decoding process in the encoding/decoding unit 8.

In this case, the MD controller 11 causes the encoding/decoding unit 14 to execute the decoding process for the reproduced data as the audio information to provide the reproduced audio output signal and reads the reproduced data in relation to the character information (character information pTDT) from the buffer memory 13 and then transmits this reproduced data to the tuner controller 31. Thereby, the tuner controller 31 causes the display unit 38 to display the transmitted character information pTDT. Accordingly, when the audio signal recorded by air-check recording method is reproduced, the character information broadcast by the multiplexing can be reproduced simultaneously and a user can observe this character information.

Cluster Structure of Minidisc System

Here, the data unit called cluster will be explained. A data string in every unit of one cluster is formed as the recording data in the minidisc system, but the format of the cluster which is a unit of the recording operation is shown in FIG. 2.

Figure 2:
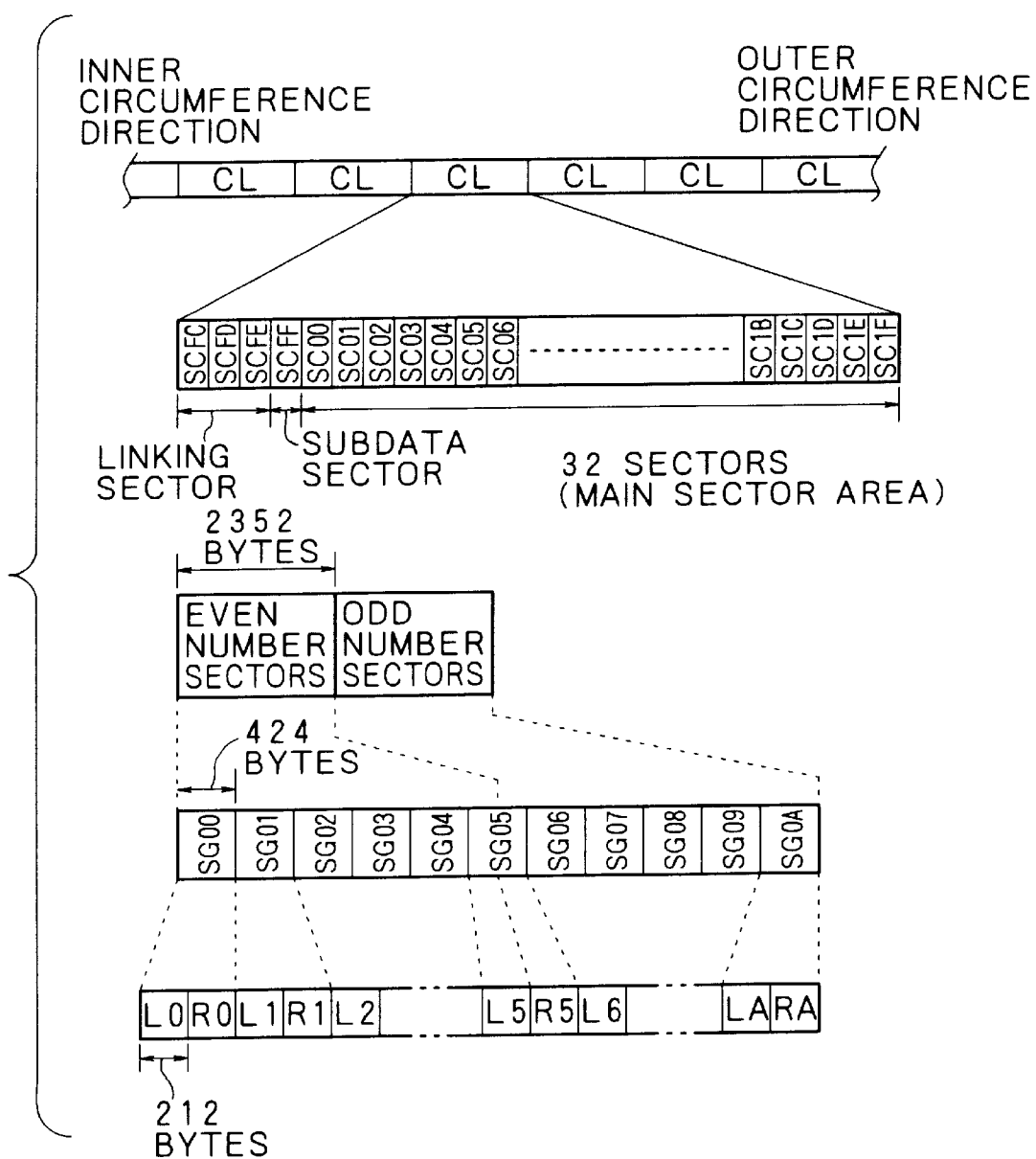
FIG. 2 is a schematic diagram showing a data format to be recorded to a magneto-optical disk applied to the present invention.

As the recording track in the minidisc system, a cluster CL is continuously formed as shown in FIG. 2 and one cluster is defined as the minimum unit for the recording operation. One cluster corresponds to the track of two to six circumferences for the data of 2.043 seconds as the actual reproducing time.

One cluster CL is composed of lining sector of three sectors indicated as sectors SCFC to SCFE, subdata sector of one sector indicated as sector SCFF and main sector of 32 sectors indicated as sectors SC00 to SC1F. Namely, one cluster is formed of 36 sectors.

One sector is the data unit formed of 2352 bytes.

The linking sectors SCFC to SCFE are used as buffer area as the partition of the recording operation and for various adjustment of operation, and the subdata sector SCFF can be used for recording of information preset as the subdata.

The TOC data and audio data, etc. can be recorded to main sectors SC00 to SC1F of the 32 sectors.

Moreover, the sector is further divided into units of sound groups and two sectors are divided to 11 sound groups.

That is, as shown in the figure, the two continuous sectors, covering the even number sectors such as sector SC00 and odd number sectors such as sector SC01, include the sound groups SG00 to SG0A. One sound group is formed of 24 bytes indicating a certain amount of audio data corresponding to the time of 11.61 msec.

In one sound group SG, data is recorded in separation to both left channel and right channel. For example, the sound group SG00 is formed of left channel data L0 and right channel data R0 and the sound group SG01 is formed of the left channel data L1 and right channel data R1.

The left channel or right channel data area formed of 212 bytes is called the sound frame.

In the minidisc system, the data having such cluster structure is recorded. In this embodiment, the audio signal demodulated at the time of air-check recording of the FM multiplex broadcasting is defined as the data of the main sectors SC00 to SC1F and the character information TDT decoded simultaneously is recorded as the data to the subdata sector SCFF.

Therefore, character information of one sector can be recorded together with the audio data of 2.043 seconds from the viewpoint of one cluster unit. The recording capacity of the real data as the subdata sector SCFF becomes 2332 bytes.

Area Format of Minidisc

The area format of the disk 90 in this embodiment will be explained with reference to FIGS. 3A and 3B.

Figures 3A, 3B:
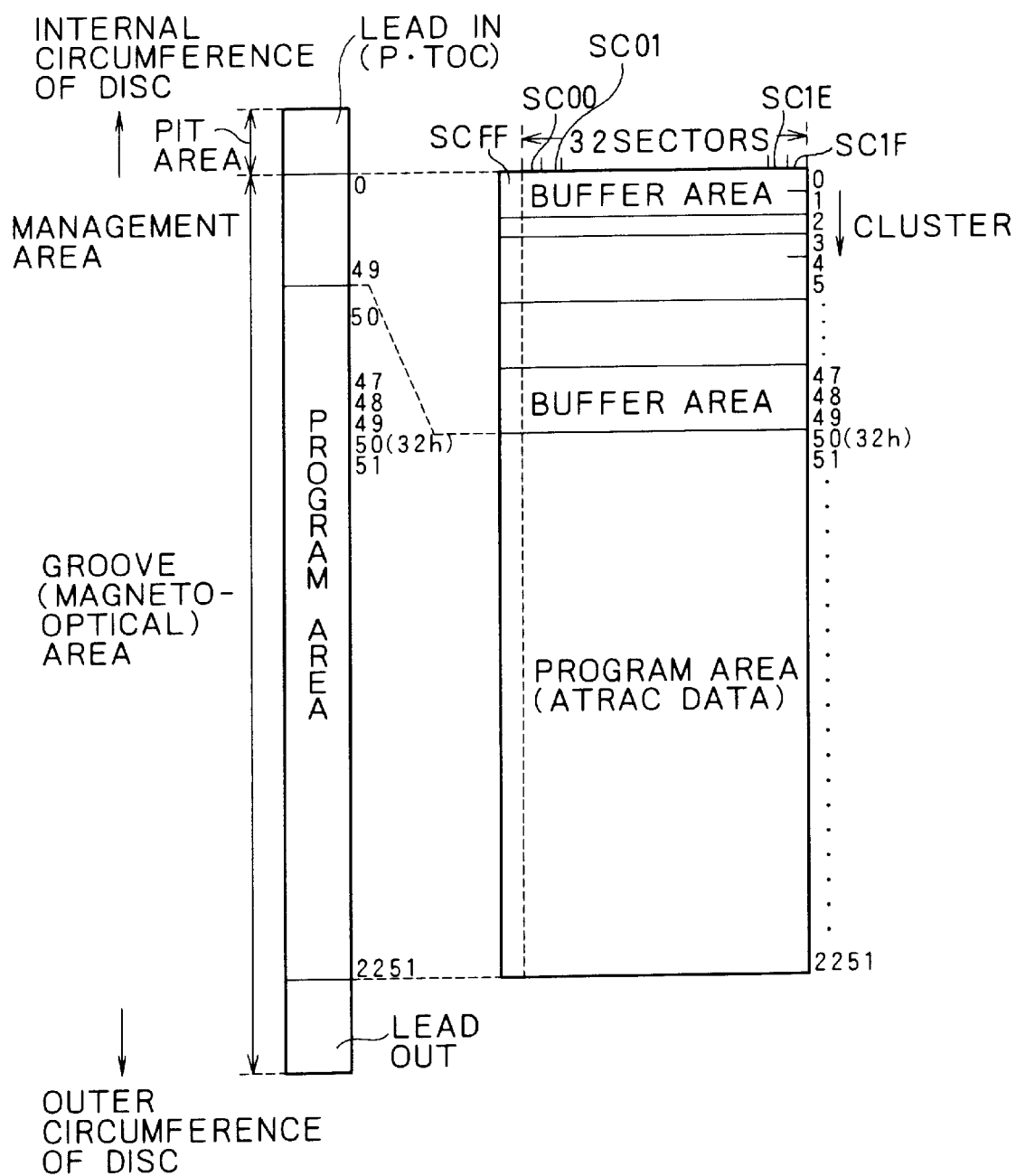
FIG. 3A is a schematic diagram showing various areas being set toward the outer rim from the inner rim of the magneto-optical disk applied to the present invention.
FIG. 3B is a schematic diagram explaining in more detail the management area and program area shown in FIG. 3A.

FIG. 3A shows the area ranging from the innermost side to the outermost side of the disk.

The disk 90 as the magneto-optical disk has pit area in the innermost side, to which the exclusive data for reproducing is formed by the emboss pit and allows recording of P-TOC to this pit area.

The external side of the pit area is defined as the magneto-optical area used as the recording/reproducing area in which a groove as the guiding groove of the recording track is formed.

The sections ranging from cluster 0 to clusters 49 in the innermost side of the magneto-optical area is defined as the management area and a music piece is actually recorded as one track to the program area ranging from the cluster 50 to cluster 2251. The external circumference of the program area is defined as the readout area.

Details of the management area is shown in FIG. 3B in which sectors are provided in the lateral direction, with clusters in the vertical direction.

In the management area, the clusters 0, 1 are used as buffer area for the pit area. The cluster 2 is used as the power calibration area PCA to adjust the output power of the laser beam.

In the clusters 3, 4, 5, U-TOC is recorded. Contents of the U-TOC will be explained later in detail but the data format is specified in each of 32 main sectors (SC00 to SC1F) in one cluster and the predetermined management information is recorded thereto. Namely, the U-TOC sector is specified so that the address of each track is recorded to the program area and the address of free area are recorded, and track name incorporated to each track and information such as recording date can be recorded.

The cluster having the sector which becomes the U-TOC is recorded three times repeatedly to the clusters 3, 4, 5.

The clusters 47, 48, 49 are used as the buffer areas for the program area.

In the program areas after the cluster 50 (32h by hexadecimal notation), the audio data such as a music piece is recorded, by the compression format called ATRAC in each of 32 main sectors (SC00 to SC1F) in one cluster. Each to be program recorded to be and a recordable area are managed by U-TOC.

In each cluster in the program area, the sector SCFF may be used for recording of information as the subdata as explained above.

U-TOC

[U-TOC Sector 0]

As explained above, for the recording and reproducing of the program to the disk 90, the MD controller 11 is requested to previously read P-TOC, U-TOC as the management information recorded to the disk 90 and to refer to this management information as required.

Here, U-TOC as the management information used for management of recording and reproducing of track program to the disk 90 will be explained.

P-TOC is the exclusive information for read operation which is formed in the pit area in the innermost side of the disk 90 as explained in regard to FIG. 3. P-TOC is used for management of locations such as the recordable area of disk, Read Out area and U-TOC area. In the reproduction only optical disk in which all data items are recorded in the pit format, all music pieces recorded by P-TOC can also be managed and therefore U-TOC is not formed.

Detailed explanation of P-TOC is omitted here.

Figure 4:
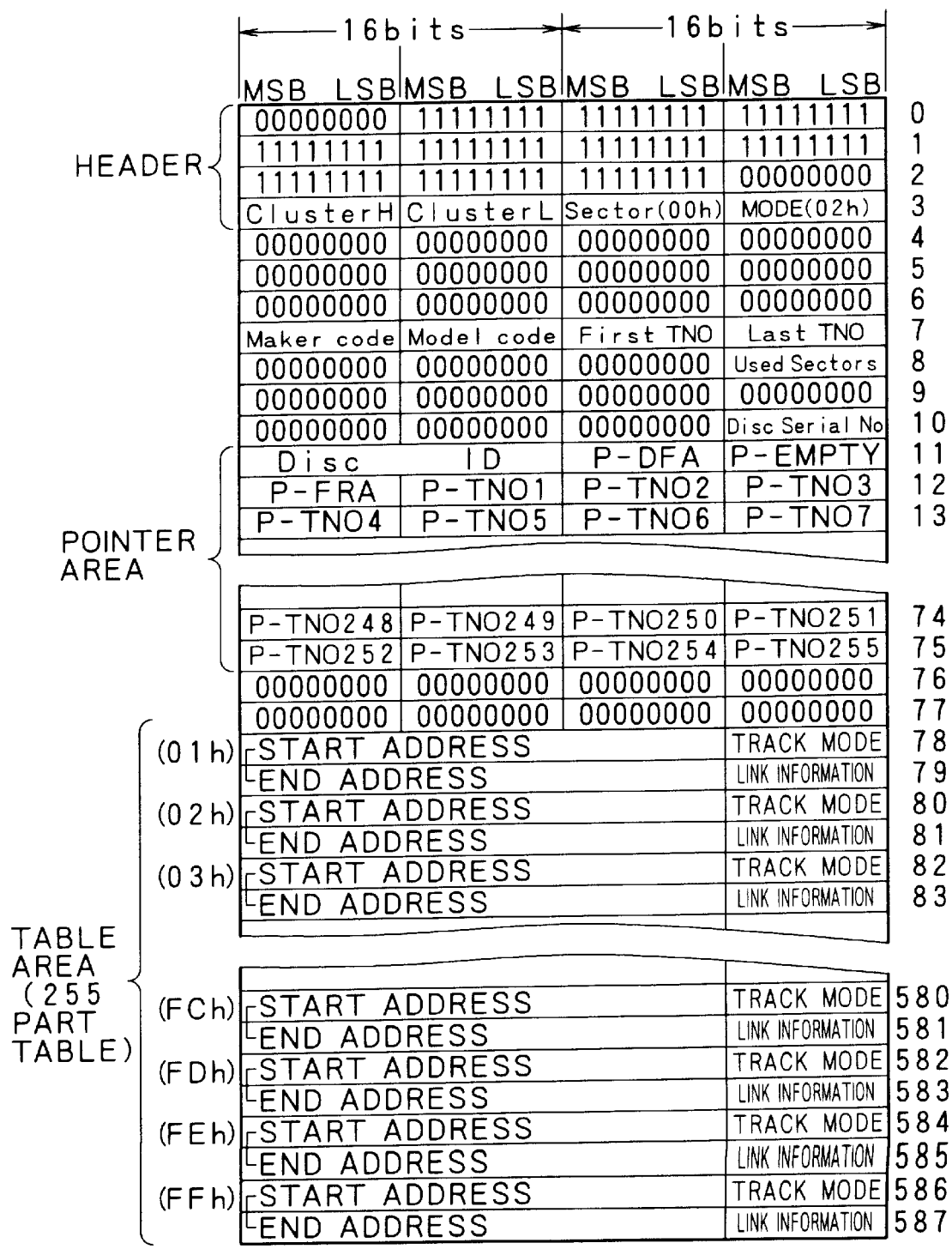
FIG. 4 shows a table of U-TOC sector 0 for management of the recording position provided in the management area of the magneto-optical disk applied to the present invention.

FIG. 4 shows a format of the U-TOC sector 0. As the U-TOC sector, sectors 0 to 32 can be provided. Namely, the sectors to be recorded correspond to the main sectors SC00 to SC1F in one cluster.

Of these sectors, the sector 1 and sector 4 are the areas for recording character information and the sector 2 is the area for recording the date of recording. The sectors 1 and 4 will be explained later and explanation of the sector 2 is omitted here.

First, the U-TOC sector 0 required for recording and reproducing of data to the disk 90 will be explained.

The U-TOC sector 0 is used as the data area in which a program such as a music piece recorded by a user and management information about the free area to which programs may be newly recorded are recorded.

For example, when a music piece is to be recorded to the disk 90, the MD controller 11 searches the free area on the disk from the U-TOC sector 0 and records the audio data to this free area. Moreover, at the time of the reproducing operation, the area in which the music piece to be reproduced is recorded is discriminated from the U-TOC sector 0 and access is made to this area for the purpose of reproducing operation.

To the data area (4 bytes×588=2352 bytes) of the U-TOC sector 0 in FIG. 4, synchronous pattern in which one-byte data of all 0 or all 1 is arranged at the starting position is recorded.

Subsequently, the address of three bytes which becomes the cluster address (Cluster H) (Cluster L) and sector address (Sector) is recorded, the mode information (MODE) of one byte is moreover added to form the header. Here, the address of three bytes is the address of the relevant sector itself.

To the header to which the synchronous pattern and address are recorded, the address of the sector itself and synchronous pattern are recorded in unit of sector even in the P-TOC sector and the sector of the program area in addition to the U-TOC sector 0.

Subsequently, data such as maker code, model code, track number of the first track (First TN0), track number of the last track (Last TN0), section using condition (Used sectors), disk serial number, disk ID, etc. is recorded to the predetermined byte position.

Moreover, in order to identify the area of program and free area, etc. recorded by a user through the recording operation in correspondence with the table section, an area for recording various pointers (P-DFA (Pointer for Defective Area), P-EMTY (Pointer for Empty Slot), P-FRA (Pointer for Freely Area), P-TN01 to P-TN0255) as the pointer section is also prepared.

As the table section corresponding to the pointers (P-DFA to P-TN0255), the 255 parts tables from (01h) to (FFh) are provided and the start address indicating the start point of a certain part, the end address indicating the end point thereof and the mode information of part are recorded in each part table. Moreover, since a part indicated in each part table is linked continuously to the other part in some cases, link information indicating the part table in which the start address and end address of the part to be linked are recorded can also be recorded.

Here, a part means the track section in which the data which is continuous in time is continuously recorded physically within one track.

The address indicated as the start address or end address becomes the address indicating one or a plurality of parts forming one program.

These addresses are recorded in the abbreviated form to designate cluster, sector and sound group.

In the recording/reproducing apparatus of this type, even when the data of one program is physically recorded discontinuously, namely recorded for a plurality of parts, no problem occurs in the reproducing operation by reproducing the data through access to each part. Therefore, in some cases, a program to be recorded by a user is recorded in a plurality of parts in view of effective use of the recordable area.

Therefore, the part tables can be linked by providing link information and by designating the parts table to be linked, for example, with the numbers (01h) to (FFh) given to each part table.

That is, in the table section in the U-TOC sector 0, one part table expresses one part and the part position is managed for the music piece formed through the linking, for example, of three parts, by the three part tables linked by the link information.

Actually, the link information is indicated by a numerical value which is defined by the arithmetic process as the byte position in the U-TOC sector 0. Namely, the part table is designated as 304+(link information)×8th (byte).

For each part table from (01h) to (FFh) in the table section of the U-TOC sector 0, contents of each part is indicated by the pointer (P-DFA, P-EMPTY, P-FRA, P-TN01 to P-TN0255) in the pointer section.

The pointer P-DFA indicates a defective area on the magneto-optical disk 90 to designate the first part table in one part table or in a plurality of part tables in which the part is shown as the defective area due to existence of flaw, etc. That is, if a defective part exists, any one of (01h) to (FFh) is recorded in the pointer P-DFA and a defective part is indicated in the corresponding part table by the start and end addresses. In addition, of the other defective part exists, the other part table is designated as the link information in the part table and a defective part is also indicated in such part table. Moreover, when there is no defective part, the link information is indicated, for example, as "00h" and thereafter it is assumed that there is no link in the subsequent tables.

The pointer P-EMPTY indicates the first part table in one or a plurality of unused part tables in the table section. When unused part tables exist, any one of (01h) to (FFh) is recorded as the pointer P-EMPTY.

When a plurality of unused part tables exist, the part table is sequentially designated from the part table designated by the pointer P-EMPTY by the link information and all unused part tables are linked on the table section.

The pointer P-FRA indicates the data reprogrammable recordable area including the erasing area on the magneto-optical disk 90 to designate the first part table in one or a plurality of part tables indicating the track part (=part) which becomes the free area. Namely, when the free area exists, any one of (01h) to (FFh) is recorded in the pointer P-FRA and the part as free area is indicated in the corresponding part table by the start and end addresses. Moreover, when a plurality of such parts exist, that is, when there are a plurality of part tables, the part table is sequentially designated by the link information, up to the table which results in the link information of "0h".

Figure 5:
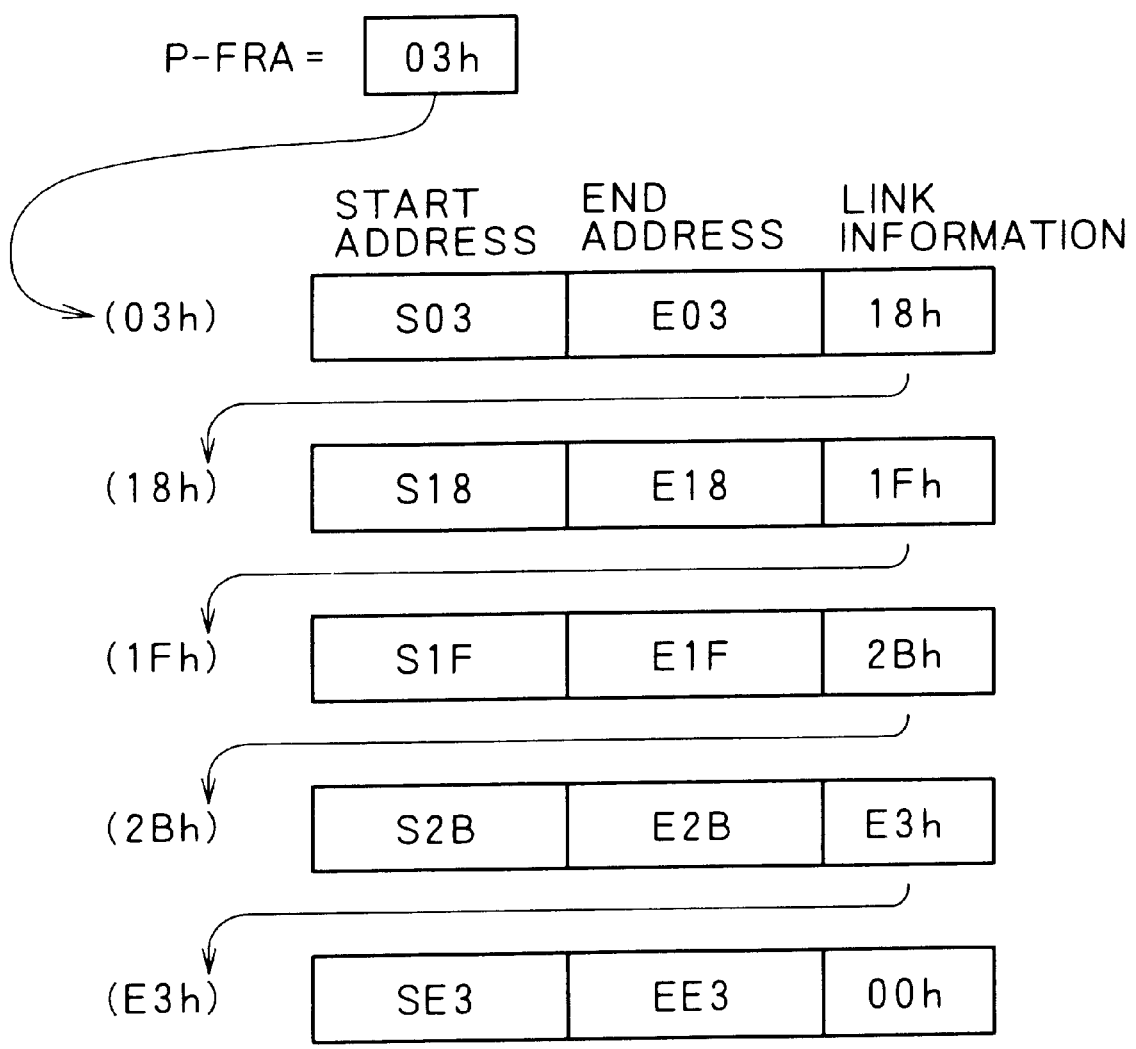
FIG. 5 is a schematic diagram showing the connecting condition of P-FRA recorded in the management area for connection of recordable areas discretely located on the magneto-optical disk applied to the present invention.

FIG. 5 schematically shows the part management condition which will become the free area using a part table. This figure shows the condition that when the parts (03h)(18h) (1Fh)(2Bh)(E3h) are assumed as free areas, this condition is also expressed by the link of the part tables (03h) (18h) (1Fh) (2Bh) (E3h), following the pointer P-FRA. It is also applied to the management mode of the defective area and unused part tables.

The pointer P-TN01 to P-TN0255 indicates the programs such as music pieces recorded by a user on the disk 90 and the pointer P-TN01, for example, designates the part table indicating the leading part in terms of time among one or a plurality of parts in which the first track data is recorded.

For example, when a program of the first track (first program) is recorded without discrete recording, that is, in one part, the recording area of the first track is recorded as the start address and end address in the part table indicated by the pointer P-TN01.

Moreover, when a program, for example, of the second track (second program) is recorded discretely in a plurality of parts on the disk, each part is designated in the timing sequence in order to indicate the second track recording position. Namely, the other part tables are designated in the timing sequence by the link information from the part table designated by the pointer P-TN02 and thereby the part tables are linked up to the part table resulting in the link information of "00h" (profile similar to FIG. 5 explained above).

Since all parts recording the data forming, for example, the second music piece as explained above are sequentially designated and recorded, the continuous music information can be obtained from the discrete parts and the recording using effectively the recording area can be realized by making access to such parts with the optical head 3 and magnetic head 6a at the time of reproducing the second music piece and performing the overwriting to the area of the second music piece using the data of this U-TOC sector 0.

As explained above, the area management on the disk is conducted by P-TOC for the re-programmable magneto-optical disk 90, and moreover, the music pieces recorded in the recordable user area and free area can be managed by U-TOC.

[U-TOC Sector 1]

Figure 6:
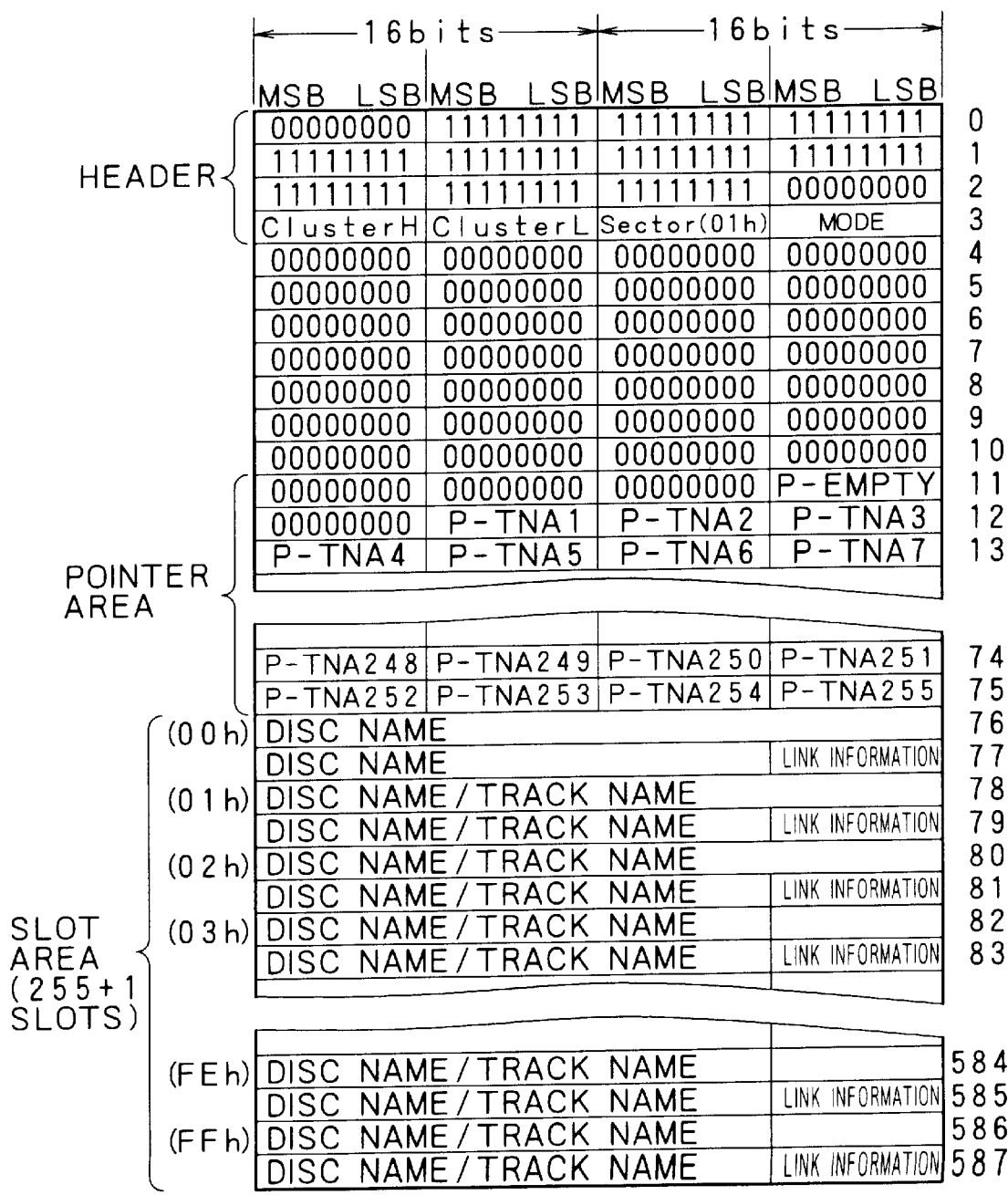
FIG. 6 shows a table of U-TOC sector 1 for management of character information provided in the management area of the magneto-optical disk applied to the present invention.

Next, FIG. 6 shows a format of the U-TOC sector 1. This sector 1 is used as the data area to record the input character information when each recorded track is given the track name or when the disk is given the disk name which becomes the information indicating the name of the disk itself.

In this U-TOC sector 1, the pointers P-TNA1 to P-TNA255 are prepared as the pointer section corresponding to each recorded track, and moreover, the slots of 255 units (01h) to (FFh), each unit is composed of 8 bytes, and one slot (00h) of 8 bytes are also prepared as the slot section designated by the pointers P-TNA1 to P-TNA255 to manage the character data in almost the same profile as the U-TOC sector 0 explained above.

In the slots (01h) to (FFh), the character information as the disk title and track name is recorded by the ASCII code(American Standard Code for Information Interchange).

To the slot designated, for example, by the pointer P-TNA1, characters input by a user corresponding to the first track are recorded. Moreover, since the slot is linked by the link information, character input corresponding to one track may become larger than 7 bytes.

The 8 bytes as the slot (00h) is assumed as the exclusive area for recording of the disk name and it is also assumed as the slot not designated by the pointer P-TNA(x).

The pointer P-EMPTY can manage the unused slot even with this U-TOC sector 1.

[U-TOC Sector 4]

Figure 7:
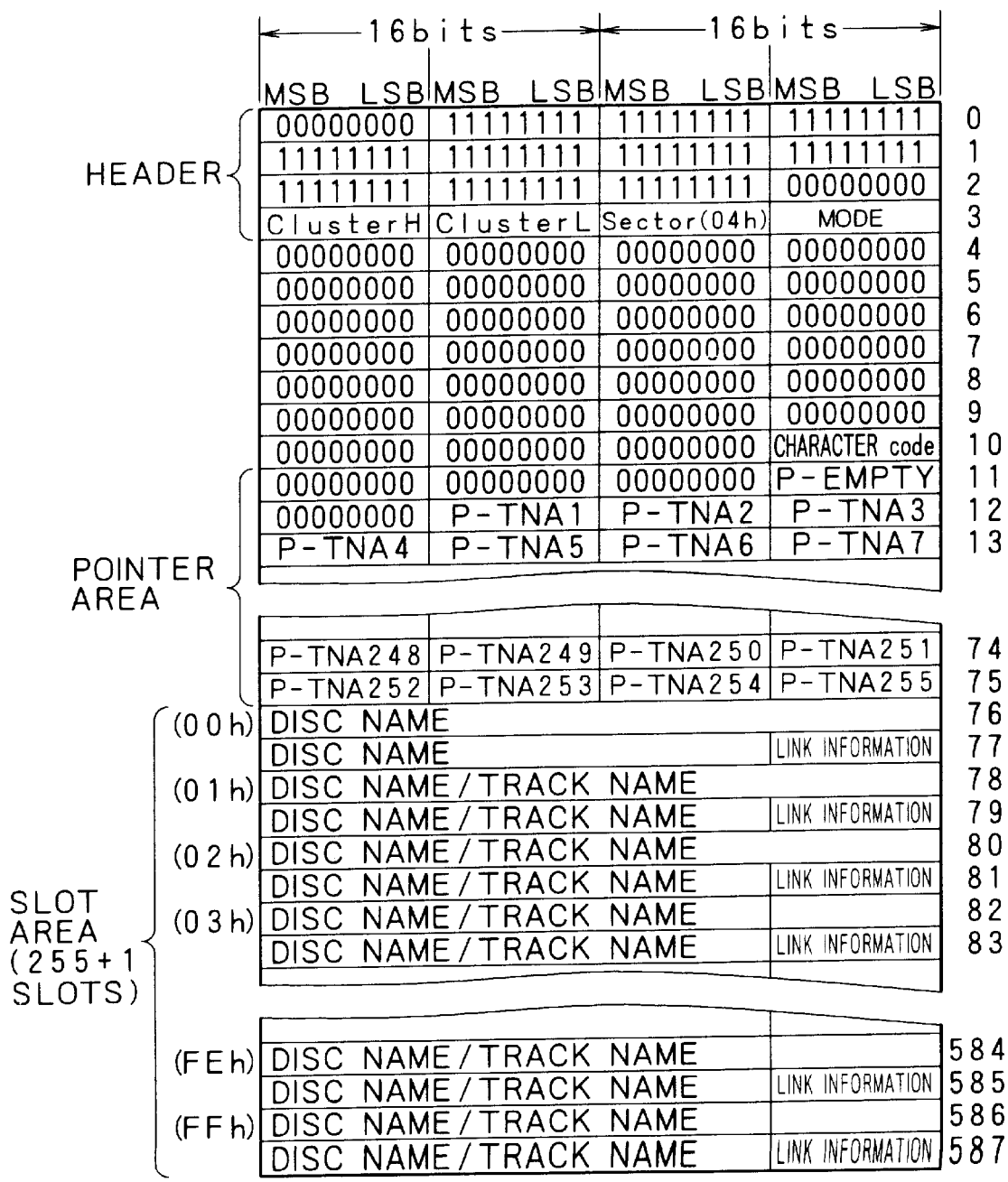
FIG. 7 shows a table of U-TOC sector 4 for management of character information provided in the management area of the magneto-optical disk applied to the present invention.

FIG. 7 shows the U-TOC sector 4. This sector 4 is assumed as the data area for recording input character information, similar to the sector 1 explained above, when the track recorded by a user is given the music name or when the disk is given the disk name and the format is almost the same as the sector 1 as is apparent from comparison of FIG. 7 and FIG. 6.

However, this sector 4 is provided to record the code data (2-byte code) corresponding to Kanji characters or alphabet and the attribute of the character code is recorded to the predetermined byte position.

Management of character information of this U-TOC sector 4 is performed, as with the sector 1, by the pointers P-TNA1 to P-TNA255 and the slots (01h) to (FFh) of 255 units designated by the pointers P-TNA1 to P-TNA255.

Area Format of Buffer Memory

The buffer memory 13 accumulates the recording or reproducing audio data compressed by the ATRAC system during the recording/reproducing operation of the disk 90 and also holds the TOC information read from the disk 90.

Moreover, as explained above, when the character information supplied from the tuner unit 30 is recorded as the subdata to the disk 90, such character information is stored and the character information decoded as the subdata is accumulated at the time of reproduction.

Figure 8:
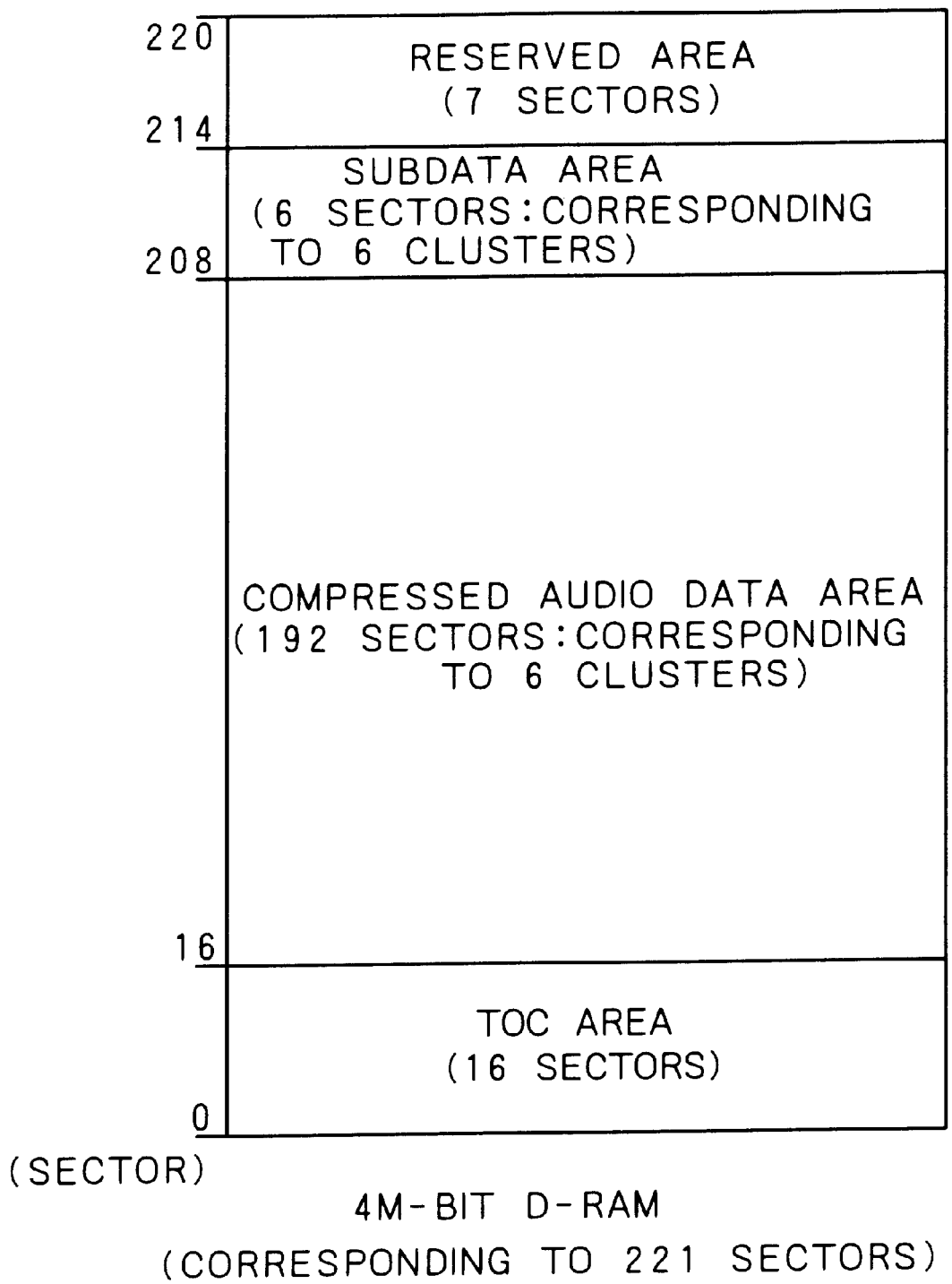
FIG. 8 is a schematic diagram showing a structure of buffer memory of the recording/reproducing apparatus with a receiving function applied to the present invention.

Because of the use as explained above, the area format, for example, shown in FIG. 8 is employed to the buffer memory 13.

The buffer memory 13 is designed, for example, as D-RAM of 4 Mbits for accumulation of data corresponding to 221 sectors.

As shown in FIG. 8, the area of 16 sectors is set as the TOC area to store the TOC information and the area of 192 sectors is acquired as the compressed audio data area to store the recording/reproducing data. Moreover, the area of six sectors is set as the subdata area to store the subdata and the area of seven sectors is set as the reserved area.

Since 32 main sectors exist in one cluster, 192 sectors as the compressed audio data area corresponds to six clusters. Moreover, since one subdata exists in one cluster, six sectors of subdata area corresponds to six clusters.

Namely, buffering for six clusters is performed in regard to the compressed audio and subdata.

As the subdata stored in the subdata area, the character information supplied by the tuner unit 30 is stored during the recording operation as explained above but the character information read from the disk 90 and supplied to the tuner unit 30 is stored during the reproducing operation.

Moreover, in regard to the TOC area, the TOC sector required for the disk 90 is stored after the disk 90 is loaded, but update process of the U-TOC sector 0, sector 1, sector 2, sector 4 is once performed in the TOC area.

Thereby, the TOC information stored(updated) in the TOC area at the predetermined timing is written to the disk 90. Namely, U-TOC is updated on the disk 90.

Character Information Format to be Broadcast

A frame format of the character information TDT superimposed on the audio signal as the FM multiplex broadcasting is shown in FIGS. 9A to 9C.

As shown in FIG. 9A, the real data as the frame which becomes a data unit of the character information TDT is formed of 190 packets. One packet is formed of 22 bytes. However, since the parity packet is added to the ordinary 190 packets, one frame is formed of 272 packets.

The real data (190 packets) of one frame as the character information TDT is transmitted in 22×190=4180 bytes in about 4.9 seconds. One second corresponds to 853 bytes.

Format of one packet (22 bytes) is shown in FIG. 9B. Namely, it is formed of the prefix information and real data.

As the packet format, two formats are provided. One format has the prefix of four bytes and data of 18 bytes, while the other format has the prefix of two bytes and data of 20 bytes.

As the prefix, the service identifying (ID) code, decoding identifying (ID) code, information endcode, update code, data group number and data packet number are recorded as shown in FIG. 9C.

The tuner controller 31 can discriminate, by means of the service ID code, the kind of contents of traffic information, program information of the character information of the packet.

Here, it is assumed that the character information TDT of the format as explained above is recorded to the disk 90 as the subdata simultaneously with the broadcast audio signal as explained above.

The recording capacity as the subdata is 2332 bytes per 2.043 seconds as explained above.

On the other hand, the real data of one frame (=4.9 seconds) as the character information is 190 packets (190×22=4180 bytes) and it becomes 853 bytes in terms of a second. It also becomes 1743 bytes (853×2.043) in terms of the time of one cluster. Therefore, it can be understood that the subdata as the character information can be recorded to the disk 90 simultaneously with the main data.

However, since one packet(=22 bytes) is output in about every 18 ms as the character information TDT obtained from the character decoder 35, the number of packets obtained during a second becomes 55.6 packets and it becomes 114 packets in terms of one cluster (2.043 seconds). Since 114 packets are equivalent to 2508 bytes, all data items of character information TDT cannot be recorded in direct to the disk 90 as the subdata simultaneously with the main data because of the reason from the viewpoint of the decoding time and recording operation time. However, as the packet data to be decoded, not only ordinary 190 packets as the real data in one frame but also a parity packet is included, and the ordinary packet among the 114 packets obtained during one cluster period, except for the parity packet, is equivalent to about 80 packets (79.3 packets in average, 81 packets in maximum).

Therefore, the amount of data of character information decoded as the ordinary packet becomes 1782 bytes (=81× 22) in maximum within the time of one cluster period. That is, the character information can be recorded, as the subdata, simultaneously with the main data by recording only the ordinary packets.

However, since the subdata is recorded with a partition of four bytes, when the data of one packet (22 bytes) is recorded as the 24 bytes data with addition of two bytes, it is just suitable from the point of view of the structure of the recording system. The amount of data to be recorded during one cluster period is equivalent to 81×24=1944 bytes. Therefore there is no problem in the capacity.

Signal Connection Mode for Character Data Transmission

Figure 10:
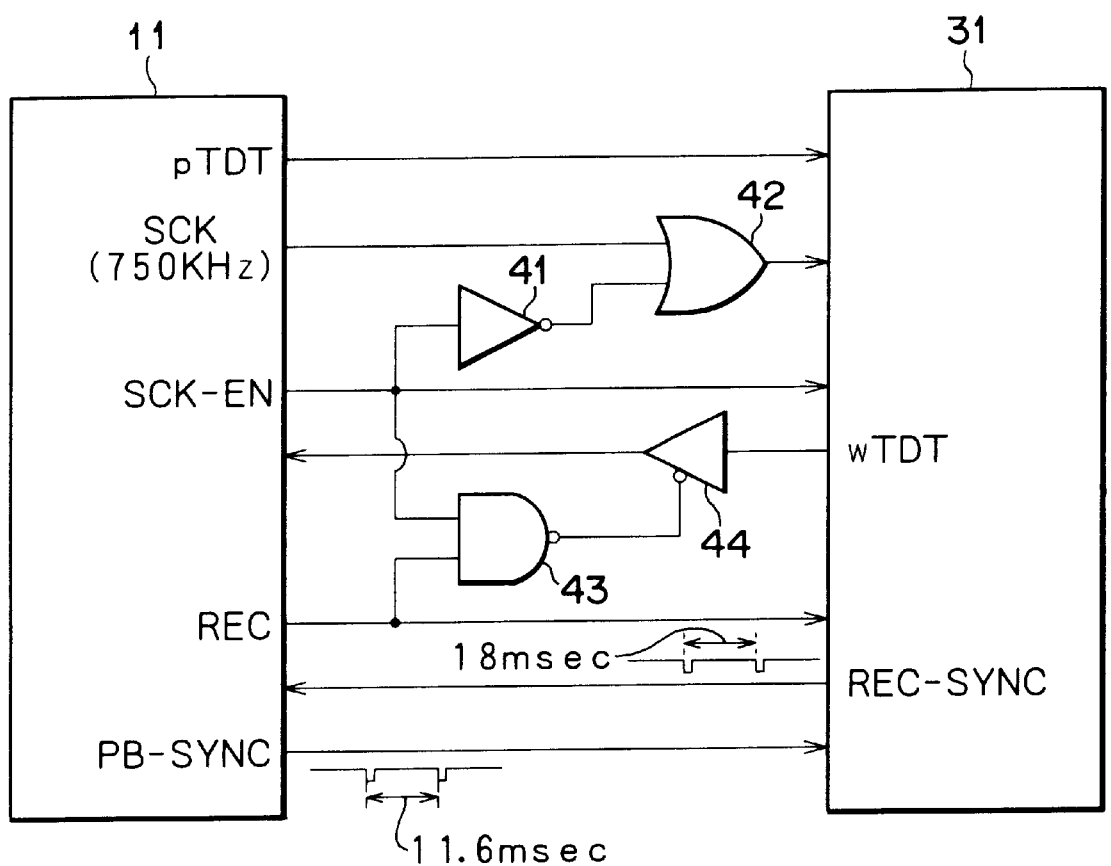
FIG. 10 is a block diagram showing the connecting condition between an MD controller loaded to the recording/reproducing unit forming the recording/reproducing apparatus with a receiving function applied to the present invention and a tuner controller loaded to the receiving unit forming the recording/reproducing apparatus with a receiving function applied to the present invention.

On the occasion of recording the received character information TDT to the disk 90 and displaying the output of the character information reproduced from the disk 90, the communication as shown in FIG. 10 is performed for the transfer of character data between the MD controller 11 and tuner controller 31.

The character information pTDT as the reproduced data, clock SCK, clock enable SCK-EN, recording condition signal REC and reproducing synch PB-SYNC are transmitted to the tuner controller 31 from the MD controller 11.

Moreover, the character information wTDT as the recording data and the recording synch REC-SYNC are transmitted to the MD controller 11 from the tuner controller 31.

When the character information as the subdata is recorded to the disk 90 together with the main data as the air-check recording, the clock SCK, clock enable SCK-EN and recording condition signal REC are transmitted to the tuner controller 31 from the MD controller 11 and the character information wTDT as the recording data and recording synch REC-SYNC are also transmitted, based on these signals, to the MD controller 11 from the tuner controller 31.

In addition, at the time of reproducing from the disk 90, the character information pTDT as the reproduced data, clock SCK, clock enable SCK-EN and reproducing synch PB-SYNC are transmitted to the tuner controller 31, from the MD controller 11 and the tuner controller 31 receives these signals to perform the display operation on the display unit 38 of the character information pTDT.

The clock SCK has, for example, the frequency of 750 kHz.

The clock enable SCK-EN is set to "H" at the time of the recording and reproducing of the character information in order to control the process of the tuner controller 31.

The clock SCK is masked by the clock enable SCK-EN to become effective only during the character data transfer process between the MD controller 11 and tuner controller 31. Namely, when the clock enable SCK-EN is set to "L" level, input of the clock SCK to the tuner controller 31 is masked depending on the inverter 41 and logical operation of the OR gate 42.

The recording condition signal REC is set to "H" only when recording is performed for the disk 90 and is set to "L" when reproducing from the disk 90 is performed or stopped.

A three-state buffer 44 is provided to the signal line of the character information wTDT as the recording data from the tuner controller 31 and it is controlled by the logical output of the AND gate 43 to the enable state only during the transfer for the recording operation. That is, the MD controller 11 accepts transfer of the character information wTDT only when the recording condition signal REC is "H" level and clock enable SCK-EN is "H" level.

The recording synch REC-SYNC generated by the tuner controller 11 during the recording operation is the pulse of 18 ms on average, namely, the synchronous signal of packet unit of the character information. During the recording operation, the MD controller 11 receives the character information wTDT transmitted with reference to the recording synch REC-SYNC.

The reproducing synch PB-SYNC generated by the MD controller 11 during the reproducing operation is a pulse of 11.6 ms, namely, the synchronous signal of the unit corresponding to the sound group in the sector as the reproduced data. The tuner controller 31 receives the character information pTDT transmitted with reference to the reproducing synch PB-SYNC.

Here, the inverter 41, OR gate 42, AND gate 43 and three-state buffer 44 may be arranged on the communication line or the logical operations of these elements may be performed within the MD controller 11 or tuner controller 31.

Character Data Transfer Process During Recording

The data transfer operation between the MD controller 11 and tuner controller 31 for recording the received main data to the disk 90 and also recording, as the subdata, the character information decoded simultaneously also to the disk 90 will be explained with reference to FIG. 11 and FIGS. 12A to 12G.

Figure 11:
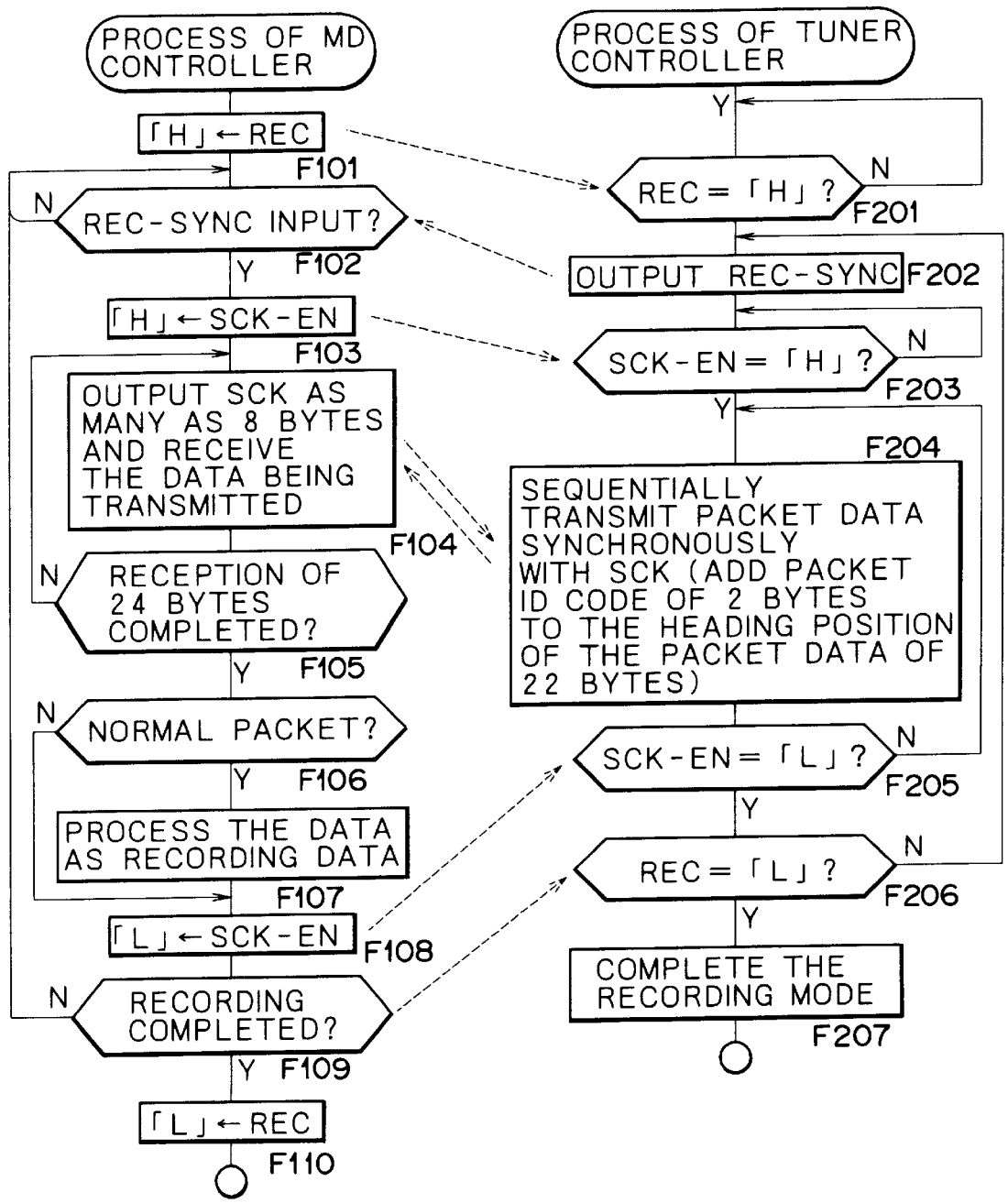
FIG. 11 is a flowchart showing the character data transfer procedures during the recording operation respectively in the MD controller and tuner controller shown in FIG. 10.

FIG. 11 shows a flowchart of the processes of the MD controller 11 and tuner controller 31 in regard to the transfer process during the recording operation, while FIGS. 12A to 12G show a timing chart of the transfer process during the encoding timing of a certain cluster (N cluster). First, the processes of the MD controller 11 and tuner controller 31 will be explained with reference to FIG. 11.

During the recording operation, the MD controller 11 sets, as the process of the step F101 of FIG. 11, the recording condition signal REC to be transmitted to the tuner controller 31 to the "H" level When the tuner controller 31 detects, in step F201 of FIG. 11, that the recording condition signal REC becomes "H", the process of tuner controller 31 enters the recording mode and goes to step F202 to perform the subsequent processes.

The tuner controller 31 starts the transfer operation to the MD controller 11 of the character information as the recording mode operation.

First, at the step F202, a pulse is output as the recording synch REC-SYNC to the MD controller 11 in the timing of the decoding operation of packet data.

The MD controller 11 is waiting for the input of the pulse as the recording synch REC-SYNC in step F102 and goes to step F103 when input of pulse is detected to set the clock enable SCK-EN to the "H" level.

When the clock enable SCK-EN becomes "H" level, the tuner controller 31 skips to the step F204 from the step F203 to cancel the mask of clock SCK to be input to the tuner controller 31.

The MD controller 11 outputs the clock SCK in step F104. In this case, the output of clock SCK is composed of eight bytes in the unit of byte.

On the other hand, the tuner controller 31 sequentially transmits the packet data as the character information, in step F204, in synchronization with the clock SCK input sequentially.

However, in this case, the tuner controller 31 transmits the data in which one packet is composed of 22 bytes with addition of the packet identifying (ID) code of two bytes at the starting area.

Therefore, one packet of this data is now composed of 24 bytes and its data format is shown in FIG. 15A.

When the decoded packet is the parity packet, the 2-byte code "8000h" is added as the packet ID code.

In addition, when the decoded packet is the ordinary packet as the real packet, the 2-byte code "0000h" is added as the packet ID code.

Moreover, when the decoded packet is the packet not including the real packet, the 2-byte code "4000h" is added as the packet ID code.

In the case of the ordinary packet, the packet data is superimposed as the actual character information on bytes 3 to 24 in 24 bytes, but in the case of the parity packet or packet having no data, bytes 3 to 24 in the data become all zeros.

The tuner controller 31 must discriminate the contents of packet data, to add the packet ID code of two bytes, whether the packet is the ordinary packet, parity packet, or the packet having no data, by referring to the service ID code among the data of one packet shown in FIG. 9B.

The MD controller 11 receives, in step F104, the packet data depending on the transfer of packet data from the tuner controller 31 in step F204.

The tuner controller 31 continues the process of the step F204 until it is detected in step F205 that the clock enable SCK-EN is set to the "L" level.

With the mutual process in steps F104 and F204, the character information of eight bytes is transmitted to the MD controller 11 side. The MD controller 11 confirms in step F104 that the data of 24 bytes can be fetched. If the data is not completely fetched, the MD controller 11 returns to step F104 to receive the data depending on the transmission of the clock SCK of eight bytes and the resultant transmission of the packet data performed in step F204 by the tuner controller 31 side.

When the transmission of the clock SCK of eight bytes in step F104 and reception of the byte data synchronized with such transmission are repeated for three times, reception of the 24 bytes, namely, one packet in step F105 can be discriminated as to be completed.

In this timing, the MD controller 11 goes to step F106 to determine whether the packet data received now is the ordinary packet or not. This process is identical to that for confirming the packet ID code added to the heading two bytes of 24 bytes.

When the received packet is discriminated as the ordinary packet by the packet ID code, such packet data is assumed as the data to be recorded to the disk 90 as the subdata in step F107. Specifically, the 22 bytes among 24 bytes except for the packet ID code of two bytes are transferred to the buffer memory 13 and it is then supplied to the encoding/decoding unit 8 together with the audio data in the predetermined timing in order to perform the encoding as the subdata in the cluster as explained above.

However, the 24 bytes per one packet including the packet ID code may be defined as the recording object. That is, it is also possible that the received 24 bytes are transferred to the buffer memory 13 to execute the recording process as the subdata.

Meanwhile, the packet data received in step F106 is determined as the parity packet or packet having no data, such packet data is not processed as the data for recording. For example, such data is cleared.

Subsequently, the MD controller 11 sets the clock enable SCK-EN to the "L" level in step F108.

Thereby, the tuner controller 31 skips to step F206 from step F205 and then skips to the step F202 when the recording condition signal REC is still in the "H" level.

Namely, the MD controller 11 controls the transfer period of one packet (period in which step F204 is executed by the tuner controller 31) with the clock enable SCK-EN.

The tuner controller 31 returns to step F202 when the clock enable SCK-EN is set to the "L" level. Here, the recording synch REC-SYNC generated in step F202 is the timing synchronized with the character information decoding process and is the pulse having the average interval of 18 ms. Therefore, the next recording synch REC-SYNC is generated in step F202 after about 18 ms from the time when the preceding recording synch REC-SYNC is generated.

On the other hand, the MD controller 11 returns to step F102 from the step F109 if the recording is not yet completed after the clock enable SCD-EN is set to the "L" level in step F108 and waits for the recording synch REC-SYNC.

When the new recording synch REC-SYNC is generated as the process in step F202 of the tuner controller 31 after about 18 ms from the time when the preceding recording synch REC-SYNC is generated, the MD controller 11 performs the processes similar to that after step F103. Depending on this operation, the tuner controller 31 performs the processes of steps F203 to F205.

Upon completion of the recording operation, the MD controller 11 goes to step F110 from step F109 to complete the process by setting the recording condition signal REC to the "L" level.

Depending on this operation, the tuner controller 31 goes to step F207 from the step F206 to complete the recording mode. When the recording condition signal REC is set to the "L" level in the course of the transfer operation, it clears the transfer operation.

Figure 12:
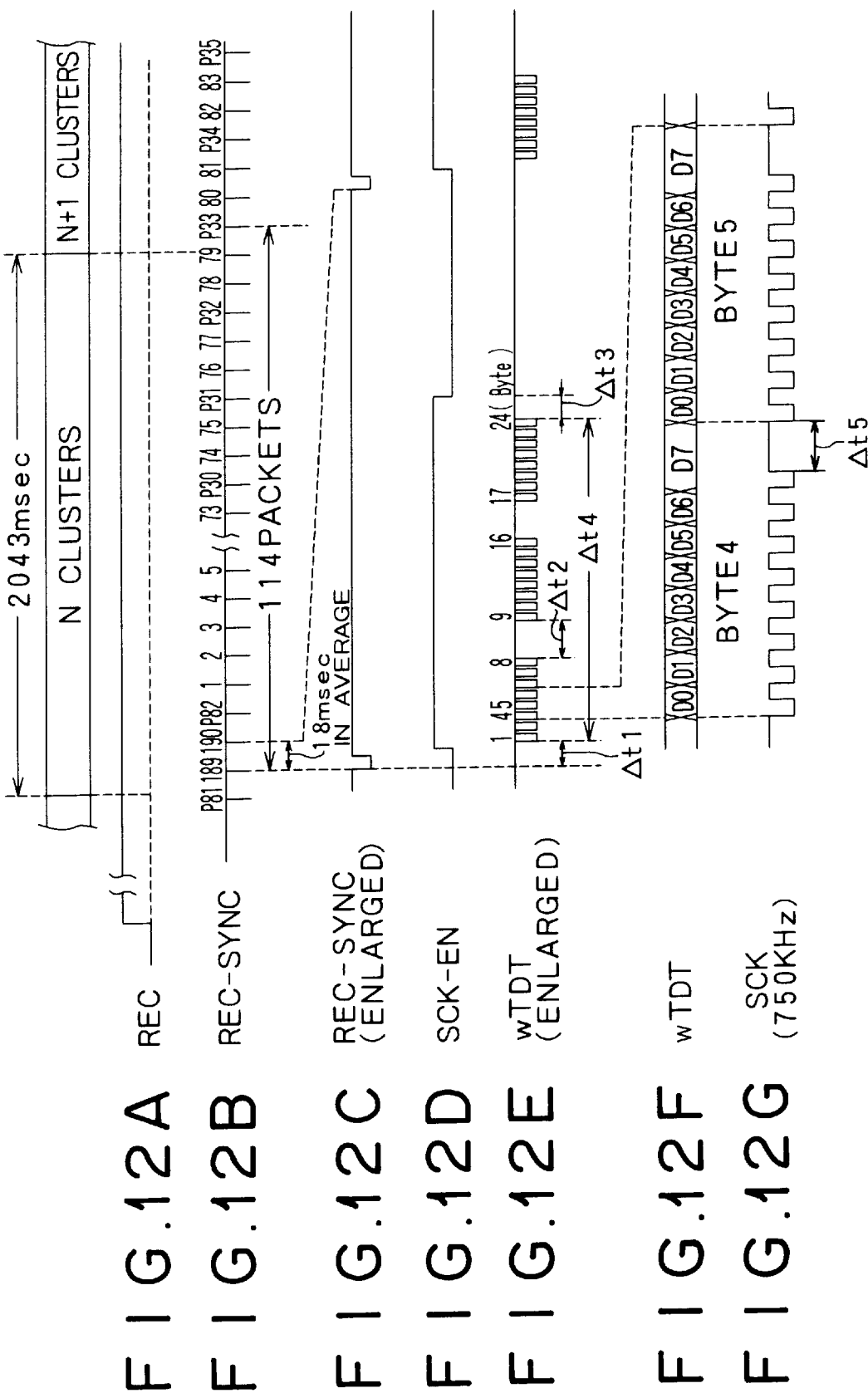
FIG. 12A is a timing chart showing a cluster encoding timing to a recording condition signal REC.
FIG. 12B is a timing chart showing the recording synchronous signal REC-SYNC.
FIG. 12C is a timing chart in which the recording synchronous signal REC-SYNC is expanded in the time axis direction.
FIG. 12D is a timing chart of the clock enable signal SCK-EN.
FIG. 12E is a timing chart showing the transfer timing of wTDT signal as the character information.
FIG. 12F is a timing chart in which the transfer timing of wTDT signal as the character information is expanded in the time axis direction.
FIG. 12G is a timing chart of a clock signal SCK.

The timing chart of the transfer operation performed by the processes explained above will be explained with reference to FIGS. 12. FIG. 12A shows the timing of the encoding of cluster. During the recording operation, the recording condition signal REC is set to the "H" level as shown in FIG. 12B. Namely, this signal is continuously in the "H" level during the period to reach step F110 from the step F101.

Since the encoding timing of the recording/reproducing unit 1 is not synchronized with the decoding timing of the character information in the tuner unit 30, timing relationship between the cluster timing and recording synch REC-SYNC (namely, the signal synchronized with the decoding in the character decoding unit 35) is different in each process as shown in FIG. 12A and FIG. 12C. The recording synch REC-SYNC is generated in about every 18 ms.

For example, in this embodiment, it is assumed that the 114 packets from the packet numbers "189" to "79" are decoded. Here the packet numbers given "P" such "P82" and "P30" and are assumed to correspond to the parity packets.

FIGS. 12D, 12E, 12F show an enlarged packet data period. In step F202, the pulse of recording synch REC-SYNC is generated as shown in FIG. 12D. Thereby, the MD controller 11 sets, in step F103, the clock enable SCK-EN to the "H" level as shown in FIG. 12E.

With the processes in steps F104 and F204, the character information wTDT as the packet data in unit of 24 bytes as shown in FIG. 12E is transferred.

As illustrated in the figure, the transfer is performed in units of eight bytes such as bytes 1 to 8, bytes 9 to 16 and bytes 17 to 24 in the 24 bytes.

FIG. 12F shows the further enlarged transfer period of the $4^{th}$ byte and $5^{th}$ byte and thereby it can be understood that each bit data is transmitted in synchronization with the clock SCK of FIG. 12G.

When the transfer of 24 bytes is completed, the clock enable SCK-EN drops to the "L" level in step F108 as shown in FIG. 12D until the next recording synch REC-SYNC shown in FIG. 12C appears.

In FIGS. 12A to 12G, the time length of each period as the timing for the data transfer process is indicated by $\Delta t1$ to $\Delta t5$ and each period is respectively defined as follow.

$\Delta t1$: 10 $\mu$sec in minimum, several milliseconds in maximum;

$\Delta t2$: 100 $\mu$sec to 300 $\mu$sec;

$\Delta t3$: 10 $\mu$sec in maximum;

$\Delta t4$: 1.5 ms in maximum;

$\Delta t5$: 10 $\mu$sec in minimum.

As is apparent from the timing chart, the data in which one packet is formed of 24 bytes is transferred as much as 114 packets in one cluster period and as is explained with reference to FIG. 11, only the ordinary packet among the packet data transferred is defined as the recording data (subdata).

Since the number of ordinary packets is ranged from 75 to 81 packets (79.3 packets in average), such data can sufficiently be recorded to the subdata sector SCFF in one cluster as explained previously.

Therefore, in this embodiment, the decoded character information can be recorded to the disk 90 simultaneously with the audio signal as the main data at the time of the air-check recording operation.

Character Data Transfer Process During Reproducing

Next, the reproducing operation of the character information recorded together with the audio signal as the main data by the recording operation explained above will then be explained below.

Namely, in the recording/reproducing unit 1, data is read, decoded and buffered as the reproducing operation from the disk 90 and the audio data, that is, the audio signal of the main data recorded in the past is reproduced and output from the terminal Aout. However, simultaneously, the character information pTDT extracted by the decoding of the subdata sector SCFF is transmitted to the tuner unit 30.

Namely, the MD controller 11 reads the decoded character information pTDT from the buffer memory 13 and then transfers it to the tuner controller 31.

Therefore, the data transfer operation between the MD controller 11 and tuner controller 31 will then be explained with reference to FIG. 13 and FIGS. 14A to 14G.

Figure 13:
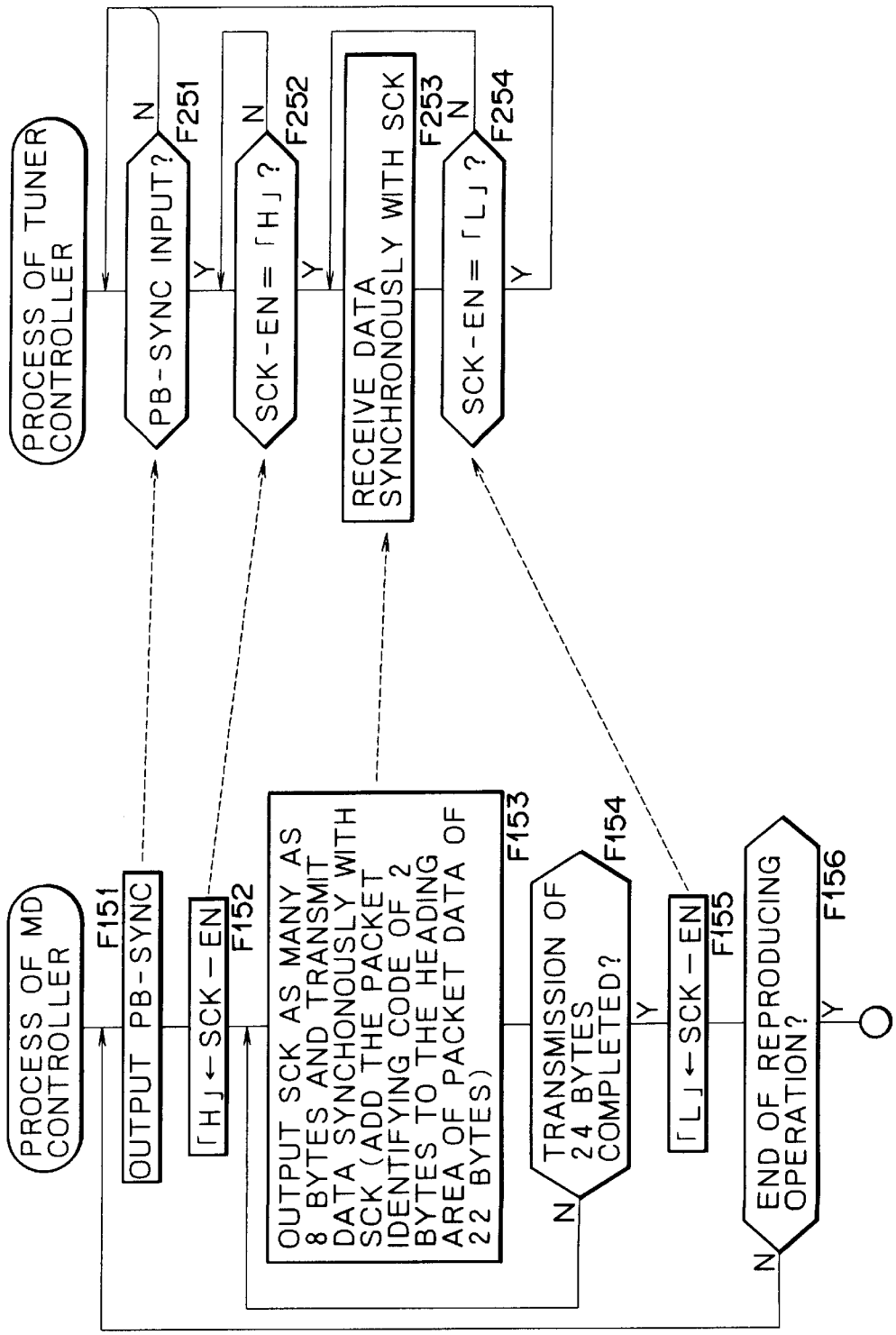
FIG. 13 is a flow chart showing the character data transfer procedures during the reproducing operation respectively in the MD controller and tuner controller shown in FIG. 10.

FIG. 13 shows a flowchart of the processes by the MD controller 11 and tuner controller 31 in regard to the transfer process during the reproducing operation, while FIG. 14A shows a timing chart of the transfer process in the output timing period, namely 2.043 seconds corresponding to the period corresponding to the data of one cluster as the reading/audio reproduced output from the buffer memory 13 of a certain cluster (N cluster). First, the processes in the MD controller 11 and tuner controller 31 will be explained with reference to FIG. 13.

During the reproducing operation, the MD controller 11 keeps the recording condition signal REC to the "L" level for transmission to the tuner controller 31.

The tuner controller 31 receives, during the period where the recording condition signal REC is in the "L" level, the character information pTDT transferred from the MD controller 11 depending on the input of the reproducing synch PB-SYNC from the MD controller 11.

The MD controller 11 transmits the data as the character information pTDT in the packet data format and generates, on the occasion of transmission in every packet, the reproduction synch PB-CYNC from the start timing of the cluster in step F151.

When input of the reproducing synch PB-SYNC is detected in step F251, the tuner controller 31 shifts to step F252 to receive the transferred data and waits the clock enable SCK-EN to become "H" level.

Immediately after the reproducing synch PB-SYNC is generated, the MD controller 11 goes to step F152 to set the clock enable SCK-EN to the "H" level.

When the clock enable SCK-EN is raised to the "H" level, the process of the tuner controller 31 moves to step F253 from step F252 and thereby the mask of the clock SCK to be input to the tuner controller 31 is canceled.

Here, the MD controller 11 outputs the clock SCK in step F153. In this case, the clock SCK is output as many as eight bytes in byte units.

Moreover, the MD controller 11 sequentially outputs the packet data as the character information in synchronization with the clock SCK.

At this time, the MD controller 11 transmits the data of the character information pTDT in which one packet is formed of 22 bytes after adding the packet identifying code of two bytes to the heading area of the information. However, as is explained in regard to the recording operation, since the character information recorded to the disk 90 is only the data of the ordinary packet, the one packet information pTDT is completely the data corresponding to the ordinary packet. Therefore, as the format is shown in FIG. 15B, the 2-byte code of "0000h" as the packet ID code corresponding to the ordinary packet is added to the heading area of the transfer data in which one packet is formed of 24 bytes. Accordingly, the actually reproduced data as the character information is superimposed on bytes 3 to 24 in 24 bytes.

As explained previously, from the view point of recording, it is also possible to introduce the processing system to record the data to the disk 90 by forming the subdata based on that one packet is formed of 24 bytes including the packet ID code. In this case, however, the packet ID code "0000h" is added, as the heading two bytes, to the data (24 bytes) in unit of packet read from the subdata during the reproducing operation In this case, the process to add the packet ID code as the process in the step F153 is naturally eliminated.

Depending on the transfer of packet data from the MD controller 11 in step F153, the tuner controller 31 receives the packet data in step F253. That is, the transfer data is fetched in synchronization with the supplied clock SCK.

The process in step F253 by the tuner controller 31 side is continued until the clock enable SCK-EN is fallen to the "L" level in step F254.

With the mutual processes in steps F153 and F253, the character information of eight bytes is first transmitted to the side of the tuner controller 31 but the MD controller 11 confirms the end of transfer output as many as 24 bytes in step F154. If the transfer is not yet completed, the MD controller 11 returns to step F153 to transmit the clock SCK of eight bytes and transfer the packet data of eight bytes.

The transfer output of 24 bytes, namely, one packet data is determined to be completed in step F154 by repeating three times the transmission of the clock SCK of eight bytes and transferring the byte data synchronized with such clock SCK in step F153.

Thereby, the MD controller 11 goes to step F115 to set the clock enable SCK-EN to the "L" level.

Accordingly, the tuner controller 31 returns to step F251 from step F254 to wait for the reproducing synch PB-SYNC.

That is, the MD controller 11 controls the transfer period (period in which step F253 is executed by the tuner controller 31) of one packet with the clock enable SCK-EN.

After the clock enable SCK-EN is set to the "L" level, if the reproducing operation is not yet completed, the MD controller 11 returns to step F151 from the step F156 to generate the reproducing synch PB-SYNC in the predetermined timing.

The reproducing synch PB-SYNC becomes the pulse having an interval of 11.6 ms as explained above, namely the timing synchronized with the reproducing output operation in the recording/reproducing unit 1.

Therefore, after 11.6 ms from generation of the preceding reproducing synch PB-SYNC, the new reproducing synch PB-SYNC is generated as the process in step F151 and subsequently the similar process is performed from step F152. Moreover, the tuner controller 31 performs the processes of steps F252 to F254 depending on the above process.

When the reproducing operation is completed, the MD controller 11 terminates the process from step F156.

When access to the disk 90 is performed in the process of reproducing, the MD controller 11 intermits the transfer in some cases.

The timing chart of the transfer operation performed by the processes explained above will be explained with reference to FIGS. 14. FIG. 14A shows the reproducing operation timing of data as the cluster and the recording condition REC is set to the "L" level during the reproducing operation as shown in FIG. 14B. The reproducing synch PB-SYNC is generated in every 11.6 ms from the leading area of the cluster as shown in FIG. 14C.

In the example of FIG. 14B, it is also assumed that the packets of the packet numbers "188" to "77" are decoded in the reproducing operation period of the data of N clusters. The parity packets are naturally not included. The number of packets are ranged from 75 to 81 (79.3 packets in average)

In FIGS. 14D, 14E, 14F, an enlarged packet data period is shown. In step F151, the pulse as the reproducing synch PB-SYNC is generated as shown in FIG. 14C and subsequently, in step F152, the clock enable SCK-EN is set to the "H" level as shown in FIG. 14D.

With the processes of steps F153 and F253, the character information pTDT of the packet data in unit of 24 bytes is transferred as shown in FIG. 14E.

As shown in the figures, transfer is performed in units of eight bytes, such as bytes 1 to 8, bytes 9 to 16 and bytes 17 to 24 in the 24 bytes.

FIG. 14F also shows a further enlarged transfer periods of bytes 4 and 5, suggesting that each bit data is transmitted in synchronization with the clock SCK of FIG. 14G.

When transfer of 24 bytes is completed, the clock enable SCK-EN is fallen to the "L" level in step F155 as shown in FIG. 14E to wait for generation of the next reproducing synch PB-SYNC shown in FIG. 14C.

FIGS. 14A to 14G show the time length of each period with Δt11 to Δt15 as the timings in relation to the data transfer process. Each period is as indicated below.

Δt11: 100 μsec to 300 μsec;
Δt12: 100 μsec to 300 μsec;

Δt13: 10 μsec in maximum;

Δt14: 1.5 ms in maximum;

Δt15: 10 μsec in minimum.

As will be understood from above timing chart, as the character information pTDT forming one packet with 24 bytes, the 79.3 packets in average obtained in one cluster period are transferred to the tuner controller 31 side.

The tuner controller 31 causes RAM 36 to store the character information pTDT transferred as explained above and also the display unit 38 to display the data.

Therefore, a user can observe the multiplexed character information broadcast when it is reproduced, while hearing the reproduced audio signal as the result of recording.

Accordingly, the name of music piece and the other character information recorded can be used, upon confirmation, as the guide of the track name input.

Moreover, this is just suitable for edition of the audio data as the main data. Namely, track division, track erasing and track coupling can be performed freely and the displayed character information can be used as the guide for operation.

In addition to the main purpose of audio recording, such timing chart can also be used for recording of the character information.

For example, even when the automatic recording is performed using, for example, a timer recording function, the character information broadcast simultaneously with the audio information as the main data can be confirmed and a user is not required to attend the place during the recording operation to surely observe the display of character information.

Moreover, in this embodiment, transfer of packet data during the recording/reproducing operation can be performed using the data of one packet=24 bytes with addition of packet ID code of two bytes. Since one packet is formed of 24 bytes, the transfer processing circuit system in unit of eight bytes is very preferable. In addition, when process is performed using the data of one packet=24 bytes for the recording to the disk 90, it matches the subdata format which is partitioned by four bytes and is suitable for the recording and reproducing operations.

Track Mark Operation Corresponding to Recording Operation

As explained above, in this embodiment, both audio information and character information of the FM multiplex broadcasting can be recorded simultaneously to the disk 90 and can also be reproduced. But, usually, the audio data (and character information) recorded as explained above is managed on the disk 90 as one track for single recording operation. For example, when the broadcasting of 60 minutes is air-checked, for example, to a virgin disk, the area of the recording data of 60 minutes is managed as the first track in the U-TOC sector 0. However, when such area is defined as one track, very complicated operation is required to reproduce the broadcast content from the intermediate area.

Therefore, in this embodiment, the track mark setting process is performed in the adequate timing during the recording operation of the audio signal and the recorded audio information and character information are appropriately divided to the tracks in the U-TOC after the recording operation.

Specifically, the track mark process is performed so that the timing to start a music piece among the programs to be recorded becomes the track dividing point.

The timing to start a music piece in the broadcasting can be detected by monitoring the character information broadcast and decoded simultaneously.

Namely, at the time of performing the air-check recording of the FM multiplex broadcasting, the audio signal demodulated as explained above is supplied to the recording/reproducing unit 1 from the tuner unit 30 and the character information decoded by the tuner unit 30 is supplied to the MD controller 11 from the tuner controller 31 for use as the subdata recording data.

In this case, the tuner controller 31 or MD controller 11 can determined whether the character information received and decoded is the information having the particular format or not (that is, whether it is the character information having the particular character string, particular characters or particular character pattern).

When a music piece is started in broadcasting, the information of music name and artist name can be transmitted almost simultaneously as a program information which is one of the character information.

Therefore, the timing that the decoded character information is determined to have the particular format as the music name information can be determined as the timing in which the music piece is started in the broadcasting.

Since the music name information is transmitted repeatedly for several times during broadcasting of a certain music piece, it is also required to determine that the decode timing of the same music name information of the second and subsequent appearance is not the time when a music piece is started.

For detection of a music name information from all character information pieces to be decoded, whether the program information to be determined from the service ID code shown in FIG. 9B is the music name information or not is determined from whether it has the particular format or not.

The particular format of the music name information must correspond to all conditions of items a), b), and c) as will be understood from the display condition of FIG. 18A.

a) character information formed of character string of two lines;

b) the character string of the first line is given the quotation marks (「 」); and c) the character string of the second line is not given the quotation marks (「 」).

Namely, the music name information is usually formed of the music name given the 「 」 marks in the first line and the artist name not given the 「 」 marks in the second line. Therefore, when the data corresponds to all conditions of items a), b) and c), it can be determined as the music name information.

Figure 16:
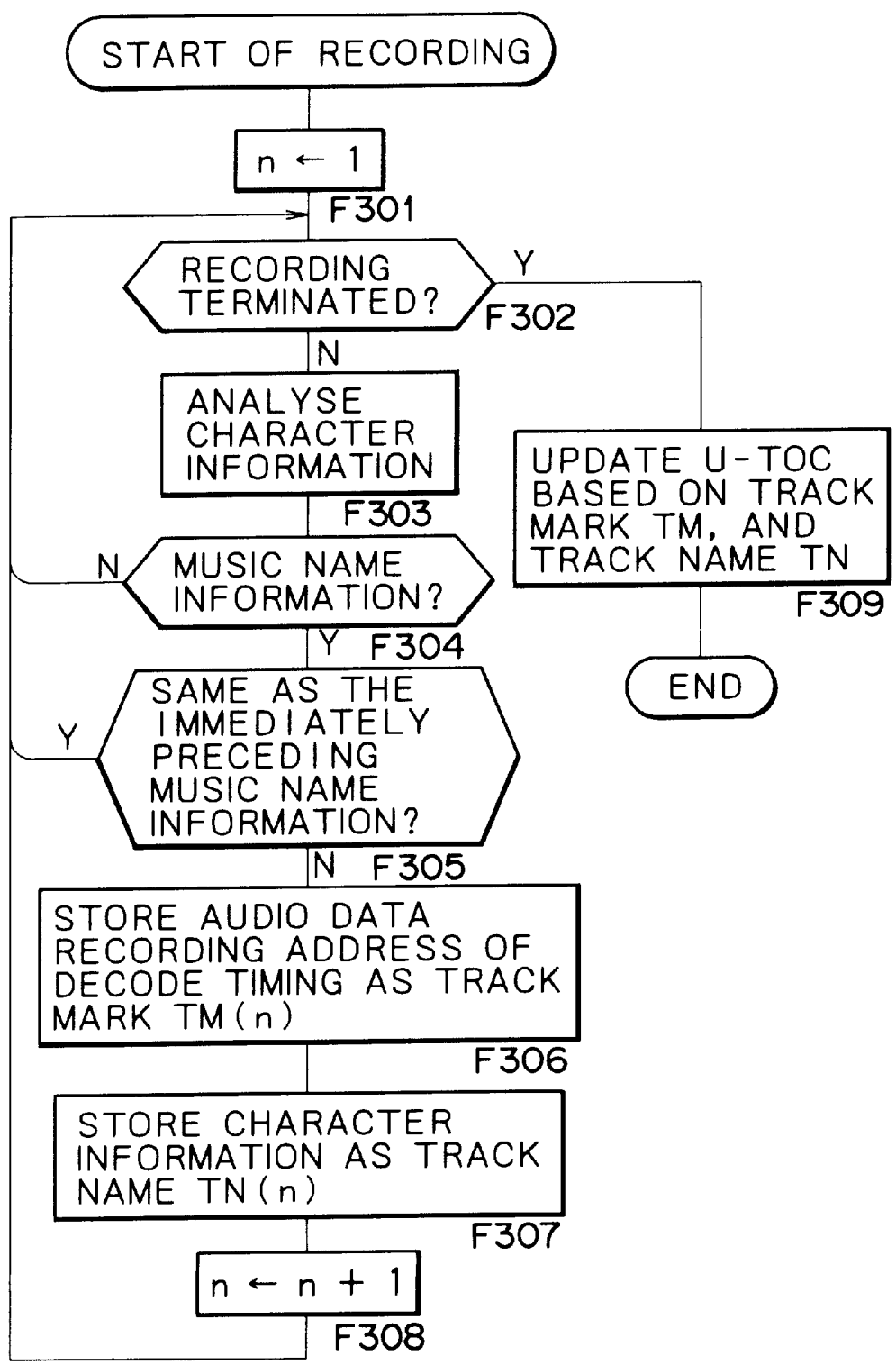
FIG. 16 is a flow chart regarding the editing procedures for editing the U-TOC information based on the recording position when the particular code is detected by analyzing the particular code from the received character information of the present invention.

The track mark processing example which is performed depending on the monitoring of the music name information during the air-check recording mode is shown in FIG. 16. FIG. 16 shows the process by the MD controller 11. However, for example, it is also possible to conduct the character information analyzing process in step F303 in the side of the tuner controller 31.

When the broadcast content is recorded to the disk 90, the character information transfer process explained with reference to FIG. 11 and FIGS. 12A to 12G, the encoding process to defining such character information and the audio signal from the audio demodulating unit 34 as the recording data and the recording operation to the disk 90 are performed and the process of FIG. 16 is also executed in parallel with such operations.

First, when the recording operation is started, a variable n is set to 1 in step F301.

As the process of step F303, the character information to be decoded is sequentially analyzed as the process of step F303.

This process determines whether the transferred character information is the music name information or not as explained above. That is, the character information is determined whether it is a program information or not and moreover whether it corresponds to all conditions of items a), b) and c) or not.

When the character information is not a program information but a traffic information and it is a program information but it is not the music name information because it does not correspond to the conditions of items a), b) and c), the process returns to step F302 from the step F304 and the process for the character information to be decoded is started in step F303.

When the character information is determined as the music name information, character string of the music name information is determined in step F305 whether it is identical or not to content of the character information determined immediately before as the music name information.

Namely, since the music name information is transmitted repeatedly for several times, after the first music name information is transmitted when the relevant music piece is started, while the several minutes during the broadcasting of such music piece, the decode timing of the same music name information after the second transmission thereof is never matched with the time when a music piece is started. Therefore, when the data is matched with the content of the immediately preceding music name information, such data is determined as the music name information transmitted by the second and subsequent transmission. That is, the process is returned to step F302 from step F305, because the decode timing of such music name information is not the start timing of the relevant music piece.

When a music name information is determined to have the content different from that of the immediately preceding music name information, the decode timing of the music name information corresponds to the timing to start the broadcasting of the music piece having the relevant music name.

Therefore, the MD controller 11 stores, to RAM 11a, the address on the disk 90 as the track mark TM(n) when the audio signal supplied to the recording/reproducing unit 1 from the audio demodulating unit 34 is encoded as the recorded audio data and recorded to the disk 90 in the decode timing of the music name information in step F306.

Moreover, in step F307, a character string as the music name information is stored to RAM 11a as the track name TN(n) corresponding to the track mark TM(n). After the variable n is incremented in step F308, the process returns to step F302.

During the recording operation, with such processes, the addresses of the audio signals on the disk 90 in the timing determined as the timing to start a music piece in the broadcasting is stored as the track mark TM1, TM2, . . . and the character strings of the music name information at this time are also stored as the track names TN1, TN2, . . . .

After completion of the recording operation, the process goes from step F302 to step F309 and at this time, the update process of U-TOC is performed depending on the recording operation. In the related art, however, U-TOC is updated to use the whole recorded data as one track. But in this embodiment, the U-TOC sector 0 is updated in such a manner that the entire part of recorded data is managed in separation to a plurality of tracks using the track marks TM1, TM2, . . . stored in RAM11a at the time of updating and also in such a manner that the track name corresponding to the divided tracks are registered in the U-TOC sector 1 or sector 4 using the track names TN1, TN2, . . . stored in RAM 11a.

The update of U-TOC is performed for the data in the TOC area of the buffer memory 13 and thereafter re-writing of U-TOC is executed on the disk 90 at the predetermined time. At this time, the broadcast audio signal of single recording on the disk 90 is divided to a plurality of tracks, considering the start timing of each music piece transmitted in the broadcasting as the dividing point.

An operation example to be realized by the processes explained above will be explained schematically with reference to FIGS. 17A to 17D, FIGS. 20 to 22.

Figures 17A, 17B, 17C, 17D:
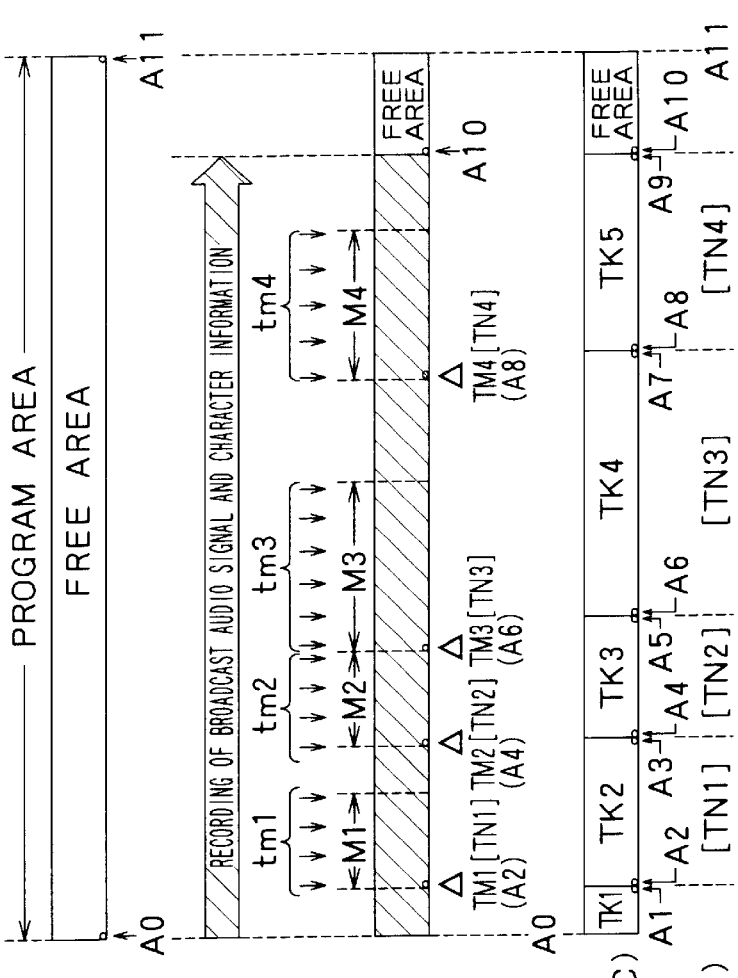
FIG. 17A is a schematic diagram showing the condition of recording medium before the recording operation.
FIG. 17B is a schematic diagram showing the recording condition of audio data as the main data and character information as the subdata being transmitted.
FIG. 17C is a timing chart indicating the position where the particular code included in the character information received during the recording operation is detected.
FIG. 17D is a schematic diagram showing the recording condition as the result of dividing process based on the position where the particular code included in the character information received during the recording operation is detected.

FIG. 17A shows a program area of the disk 90 before the recording operation. In this case, the disk 90 is a virgin disk and the entire part of the program area is defined as the free area.

The management condition of the U-TOC sector 0 at this time is as shown in FIG. 20. For the convenience of explanation, the management condition examples of the UTOC is shown in FIGS. 20 to 22. But these are only examples.

Moreover, in FIGS. 20 to 22, the part where one byte data is defined as "00h" as the pointer and link information in the U-TOC and the part where the three-byte data as the start address and end address is defined as "000000h" are indicated with a hyphen (–)

In addition, it is assumed that there is no defective area in the recordable user area on the disk 90 and therefore the table pointer P-DFA is all defined as "00h" in each figure.

In the virgin disk of FIG. 17A, all program areas are considered as the free areas but if the leading address of this program area is assumed as A0 and the last address as A11, the part table, for example, (01h) is indicated, as shown in FIG. 20, in the pointer P-FRA managing the free area and moreover the address A0 is indicated as the start address and the address A11 as the end address to the part table (01h) corresponding to such part table. In this case, since there is no other free area part physically isolated, the link information of the part table (01h) is defined as "00h".

Moreover, the pointer P-EMPTY indicating unused part table indicates, in this case, the part table (02h), and all unused part tables up to the part table (FFh) from the part table (02h) are linked by the link information.

Here, it is assumed that the air-check recording of a certain broadcast program is started from the condition of FIG. 17A managed as explained above and the broadcast audio signal and character information are recorded to the free area as indicated by the arrow mark with the slash at the upper stage of FIG. 17B.

Here, it is also assumed that four music pieces are on-aired as indicated by M1 to M4 in the program and the audio data as the music pieces M1 to M4 are recorded in the section shown in FIG. 17C on the disk 90.

Moreover, it is also assumed that the music name information of each music piece is broadcast while the music pieces M1 to M4 are broadcast and are recorded to the disk 90 but the music name information of each music piece is decoded in the timing indicated by the arrow marks tm1 to tm4. For example, during the broadcasting of the music piece M1, the music name information is transmitted and decoded four times as indicated by the timing tm1, while during the broadcasting of the music piece M2, the music name information is transmitted and decoded four times as indicated by the timing tm2.

Here, the first music name information of a certain music piece is determined in steps F303 to F305 of FIG. 16 at the start timing among a plurality of timings indicated by the timings tm1 to tm4.

Therefore, the data recording address corresponding to each start timing in the timings tm1 to tm4 is stored as the track marks TM1 to TM4 as illustrated in the figure. The address stored as the track mark TM1 is temporarily stored as A2, the address stored as the track mark TM1 as A4, the address stored as the track mark TM3 as A6 and the address stored as the track mark TM4 as A8.

Moreover, with the process in step F307, the character strings of character information decoded at this time corresponding respectively to the track marks TM1 to TM4 are stored as the track names TN1 to TN4.

When the recording operation of the audio information and character information of FIG. 17B is completed leaving the free area after the address A10, RAM11*a* stores the track marks TM1 to TM4 and track names TN1 to TN4 as shown in FIG. 19. The character strings shown in FIG. 19 as the track names TN1 to TN4 are character strings as the music name information decoded when the track marks TM1 to TM4 are given.

The process of FIG. 16 goes to step F309 depending on the process that the recording operation to the program area is completed in order to update the U-TOC depending on the recording operation. During this period, however, the update process is performed depending on the track marks TM1 to TM4 and track names TN1 to TN4 as shown in FIG. 19 and the U-TOC sector 0 is rewritten, for example, to the condition of FIG. 21 from the condition of FIG. 20. Thereby, all areas recorded as shown in FIG. 17D are managed under the condition that these areas are divided to the five tracks TK1 to TK5.

Since the addresses as the track marks TM1 to TM4 are defined as the starting addresses (namely, partition of track) of each track, the first track is defined to the area starting from the recording start address (address A0 in this case) and ending to the address A1 immediately before the address A2 as the first track mark TM1.

That is, since the start address A0 and end address A1 are indicated in the part table (01h) indicated in the pointer P-TN01 as shown in FIG. 21, the relevant section is managed as the first track TK1.

The second track is defined by the area starting from the address A2 of the track mark TM1 and ending by the address A2 immediately before the address A4 as the next track mark TM2.

Namely, since the start address A2 and end address A3 are indicated in the part table (0h) indicated by the pointer P-TON02, this section is managed as the second track TK2.

Moreover, the third track is defined by the area starting from the address A4 of the track mark TM2 and ending at the address A5 immediately before the address A6 as the next track mark TM3.

Namely, since the start address A4 and end address A5 are indicated in the part table (03h) indicated in the pointer P-TN03, this section is defined as the third track TK3.

In the same manner, since the start address A6 and end address A7 are indicated in the part table (04h) indicated in the pointer P-TN04, the section starting from the address A6 of the track mark TM3 and ending at the address A7 immediately before the address A8 as the track mark TM4 is defined as the fourth track TK4.

Similarly, since the start address A8 and end address A9 are indicated in the part table (05h) indicated in the pointer P-TN05, the section starting from the address A8 of the track mark TM4 and ending at the recording end address A9 is defined as the fifth track TK5.

Here, since the free area is defined by the addresses A01 to A11, the part table (06h) is designated, for example, by the pointer P-FRA and the start address A10 and end address A11 as the free area are recorded to the part table (06h).

Moreover, in this case, the table pointer P-EMPTY indicating the unused part table indicates the part table (07h) and unused part tables from the part table (07h) to the part table (FFh) are all linked by the link information.

In addition, as the update process in step F309, the U-TOC sector 1 or sector 4 is updated.

Namely, the track names TN1 to TN4 stored as shown in FIG. 19 are recorded in the U-TOC sector 1 or sector 4 as the track names for the track starting from the address of the corresponding track mark.

FIG. 22 shows the condition where the character strings as track names TN1 to TN4 are registered to the U-TOC sector 1.

In regard to the first track TK1 of FIG. 17D, since the relevant character string is not stored (it is for example narration and is not a music piece), the pointer P-TNA1 is defined as "00h" as shown in FIG. 22 and the track name is not registered.

Since the character string ["MY SONG" XYZ] is stored as shown in FIG. 19 in the track name TN1 corresponding to the track mark TM1 indicating the starting point of the second track TK2, it is registered as the track name of the second track TK2 as shown in FIG. 22. That is, the pointer P-TNA2 is defined for example as "01h", moreover the part table (02h) is linked from the part table (01h), and thereby the character string ["MY SONG" XYZ] is recorded as the ASCII code to the area of seven bytes of these couple of part tables.

In the same manner, in regard to the third track TK3, the part tables (03h) (04h) (05h) are used due to the link from the pointer P-TNA3 and the character string stored as shown in FIG. 19 is recorded as the track name.

Similarly, for the fourth track TK4 and fifth track TK5, the part tables designated by the link from the pointers P-TNA4, P-TNA5 are used and the character string stored as shown in FIG. 19 is recorded as the track name.

When the music name information is formed as a character string including Kanji characters and this character string is stored to RAM11*a* as the track names TN1, TN2, . . . , it is enough that such character name is registered as the track names in the U-TOC sector 4. In addition, as a system to record the character string including Kanji characters to the U-TOC sector 1, it is possible to generate the character string as the track names to be registered by converting the character string including Kanji characters to that of alphabets or translating such character string.

As explained above, since the U-TOC sector 0 and sector 1 (or sector 4) are updated under the management condition shown in FIG. 21 to FIG. 22 as the process of step F109, single recording operation is completed and the track name is automatically registered in regard to the track as a music piece under the condition that the total area recorded as shown in FIG. 17D is divided to a plurality of tracks defining the starting point of respective music piece as the dividing point.

When the recording data is managed under the condition of FIG. 17D, the broadcast area of each music piece can immediately be reproduced by designating the track number to instruct the reproducing operation during the reproducing operation. Moreover, in this case, since the registered track name is also displayed, the reproducing operation can be guided and the music name can also be confirmed.

Since the character information of broadcasting recorded as the subdata is reproduced, music piece and the other information can also be confirmed by observing such reproduced output.

Namely, since the data of the single air-check recording is divided to a plurality of tracks defining the starting point of the music piece as the initial point, operation by user for the reproducing operation can be very simplified.

Actually, it is probable that particular formats a), b), c) to discriminate the music name information are sometimes used for the data other than the music name information. Moreover, it is also probable that a certain time lag is generated until the music name information is transmitted from the start of broadcasting of the music piece. Accordingly, the track dividing point by the track mark process is not always located strictly at the starting position of a music piece.

However, since the time lag is only several seconds, the starting point of track can almost be located at the area near the starting point of the music piece, not resulting in any problem, and if it is requested to accurately locate the starting point of track to the starting point of the music piece, it can be attained without resulting in any problem by changing the dividing point through the necessary editing operation for track dividing, linking and erasing by user.

Here, a certain time lag maybe generated until the music name information is broadcast from the start of the broadcasting of a music piece because of the character information encoding process in the broadcasting station side. For example, a certain broadcasting station always transmits the music name information with a time lag of about five seconds from the start of broadcasting of music piece.

Time lag of several seconds will not result in any problem for the coarse track mark process only as the guide for queue during the reproducing operation, but when it is requested to raise the accuracy in regard to the track mark at the starting position of the music piece, the track mark process must be performed considering such time lag.

For example, when the time lag is about five seconds on average, it is also possible, at the time of storing the address as the track mark TM(n) in step F306, that the address of the position where the data is recorded as the audio signal at the point five seconds before the point in which the character information is decoded is set as the address of track mark TM(n).

Moreover, when it is also probable to use the above particular formats a), b) and c) to discriminate the music name information for the information other than the music name information, addition of the particular characters or character strings to identify the music name information is also possible. Namely, in the broadcasting station side, the particular characters are added to the particular position like the musical note marks given, for example, at the starting position of the character string in FIG. 18B. Thereby, the receiving side can determine accurately whether the information is the music name information or not depending on existence of such particular characters and thereby adequate track mark process can be performed.

Moreover, in the above explanation, the music piece starting point is set to the track driving point, but it is also possible that a user previously sets, for example, a keyword such as the particular character string and the track mark process is performed on the basis of such keyword. For example, a favorite artist name is registered as the particular character string and thereby the MD controller 11 sets the track mark depending on the timing where the registered particular character string is detected as the character information.

Thereby, the starting point of a music piece of a certain artist is set as the starting point of a certain track as the music piece to be recorded and a music piece of the favorite artist can easily be searched and heard from the recorded broadcast audio signals.

In addition, since the character information is searched, when the related information of an artist is broadcast as the character information, the track mark is given in such timing for the purpose of track division. In this case, the reproduced audio signal of such track is not always the adequate point such as the starting point of the music piece but it becomes the information of the favorite artist for a user as the character information reproduced and indicated simultaneously. That is, only the wanted information among the character information recorded can easily be searched and reproduced at the time of reproducing operation.

Various settings as the character information of the particular format searched for the track mark process are of course possible and therefore, it is requested to perform the search of character information to divide the track at the point having higher possibility of later reproducing operation by a user.

In this embodiment, it is assumed that a minidisc system is introduced, but the present invention is not limited thereto. Namely, it is also possible to introduce, as the recording/reproducing unit 1, the system using a recording medium which can simultaneously record the audio data and subdata. Specifically, a hard disk drive system, DVD (digital video disk/digital versatile disk) system and DAT (digital audio tape) system may be employed.

Moreover, the present invention can also be applied to the system which can record the video data and character information at the same time.

As can be understood from above explanation, when the broadcast audio signal and character information are received simultaneously like the FM multiplex broadcasting, such data can be recorded as the main data, the program dividing point in regard to the main data during the relevant recording operation is set depending on the timing to detect the character information of the particular format as the character information received by the broadcasting receiving apparatus during the main data recording operation, and the main data in relation to the relevant recording operation can be managed as the program divided at the preset program dividing point on the recording medium Therefore, the queued reproducing operation of the main data can be performed depending on the timing to decode the character information of the particular format during the reproducing operation later. Particularly, since the track mark processing is performed depending on the timing to decode the music name information, the starting point of each track can be set as the starting point of each music piece at the time of reproducing operation and the favorite music can easily and smoothly searched from the recorded audio signals.

That is, the convenient point track dividing can be realized at the time of reproducing operation for the recorded audio signal or to the character signal in view of remarkably improving the operation characteristic during the reproducing operation.

Moreover, when the track mark process is performed by detecting the character information of particular format as music name information, a user can enjoy the effect that the track name input corresponding to each program can be done automatically by setting the character string of the music name information as the name information corresponding to the program divided at the preset program dividing point.

Moreover, the program division can be realized at the adequate point by setting, as the program dividing point, the address of recording position on the recording medium where the audio signal received in the timing to detect the character information of the particular format is recorded as the main data.

In addition, when the music name information is transmitted with a certain time lag, the program division can be realized at the adequate point without relation to time lag by setting, as the program dividing point, the address of the recording position on the recording medium where the audio signal point received in the timing preceding the predetermined time than the timing to detect the character information of particular format is recorded as the main data.

Moreover, since the character information of the particular format is structured as the character information having particular character string, or character or character pattern, versatile program divisions can be realized accurately satisfying the user's needs.

What is claimed is:

1. A recording apparatus with a receiving function comprising:

receiving means for receiving main data and subdata including a partitioning code to be transmitted from a broadcasting station;

partitioning code extracting means for extracting said partitioning code from the subdata received by said receiving means;

recording means for recording to a recording medium the main data and subdata, from which said partitioning code is removed, received by said receiving means;

storing means for storing the recording position under the recording operation on said recording medium when said partitioning code is extracted by said partitioning code extracting means; and editing means for performing the divided edition of the main data on the basis of the recording position stored in said storing means after the main data and the subdata, from which said partitioning code is removed, received by said receiving means are recorded to said recording medium.

2. A recording apparatus with a receiving function as claimed in claim 1, wherein said recording medium is provided with a main data area to record said main data and a management area to record the management information assuring correspondence between information unit recorded in said main data area and the recording position and said editing means edits the management information assuring correspondence between information unit recorded in said management area and the recording position on the basis of the recording position stored in said storing means.

3. A recording apparatus with a receiving function as claimed in claim 1, wherein said main data is audio data and said subdata is character information corresponding to said main data.

4. A recording apparatus with a receiving function as claimed in claim 1, wherein said partitioning code is formed of a particular character string or particular characters.

5. A recording apparatus with a receiving function as claimed in claim 1, wherein said editing means for dividing and editing the main data based on the recording position stored in said storing means conducts the dividing process at the position going back the predetermined width from the recording position stored in said storing means.

6. A recording apparatus for receiving main data and subdata including the partitioning code transmitted from a broadcasting station and recording said received main data and subdata to a recording medium providing main data area for recording main data, subdata area for recording subdata, a first management area for management of main data recorded to main data area and a second management area for management of subdata recorded to subdata area, comprising:

partitioning code extracting means for extracting said partitioning code from said received subdata;

recording means for recording said received main data to said main data area and also recording said subdata from which said partitioning code is removed to said subdata area;

storing means for storing the recording position under the recording operation to the main data area of said recording medium when said partitioning code is extracted by said partitioning code extracting means; and editing means for editing said first management area so that main data is divided and edited on the basis of the recording position stored in said storing means after the received main data and subdata, from which said partitioning code is removed, are recorded to said recording medium.

7. A recording apparatus as claim in claim 6, wherein said recording medium is provided with main data area to record said main data and management area to record management information giving correspondence between information unit and recording position recorded in said main data area, and said editing means edits management information giving correspondence between information unit and recording position recorded in said management area based on the recording position stored in said storing means.

8. A recording apparatus as claimed in claim 6, wherein said main data is audio information and said subdata is character information corresponding to said main data.

9. A recording apparatus as claimed in claim 6, wherein said partitioning code is formed of a particular character string or particular characters.

10. A recording apparatus as claimed in claim 6, wherein said editing means to divide and edit main data based on the recording position stored in said storing means performs the dividing process at the position going back the predetermined width from the recording position stored in said storing means.

* * * * *